(12) United States Patent
Hoshina et al.

(10) Patent No.: US 10,673,103 B2
(45) Date of Patent: Jun. 2, 2020

(54) BATTERY MODULE, BATTERY PACK AND VEHICLE

(71) Applicant: KABUSHIKI KAISHA TOSHIBA, Minato-ku (JP)

(72) Inventors: Keigo Hoshina, Kashiwazaki (JP); Yoshiyuki Isozaki, Tokyo (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 77 days.

(21) Appl. No.: 15/692,103

(22) Filed: Aug. 31, 2017

(65) Prior Publication Data

US 2017/0365886 A1    Dec. 21, 2017

Related U.S. Application Data

(63) Continuation of application No. PCT/JP2015/076311, filed on Sep. 16, 2015.

(51) Int. Cl.

| | |
|---|---|
| *H01M 4/485* | (2010.01) |
| *H01M 4/505* | (2010.01) |
| *H01M 4/525* | (2010.01) |
| *H01M 4/58* | (2010.01) |
| *H01M 10/0525* | (2010.01) |
| *H01M 10/42* | (2006.01) |
| *H01M 10/44* | (2006.01) |
| *H01M 10/48* | (2006.01) |
| *H01M 2/10* | (2006.01) |
| *H01M 4/131* | (2010.01) |
| *H01M 4/133* | (2010.01) |
| *H02J 7/00* | (2006.01) |

(52) U.S. Cl.
CPC ....... *H01M 10/441* (2013.01); *H01M 2/1077* (2013.01); *H01M 4/131* (2013.01); *H01M 4/133* (2013.01); *H01M 4/485* (2013.01); *H01M 4/505* (2013.01); *H01M 4/525* (2013.01); *H01M 4/5825* (2013.01); *H01M 10/0525* (2013.01); *H01M 10/4257* (2013.01); *H01M 10/482* (2013.01); *H02J 7/0021* (2013.01); *H01M 2220/20* (2013.01); *Y02E 60/122* (2013.01)

(58) Field of Classification Search
CPC .... H01M 2/1077; H01M 4/131; H01M 4/133; H01M 4/485; H01M 4/505; H01M 4/525; H01M 4/5825; H01M 10/0525; H01M 10/4207; H01M 10/4257; H01M 10/441; H01M 10/482; H01M 2220/20; H02J 7/0021

See application file for complete search history.

(56) References Cited

U.S. PATENT DOCUMENTS

| | | | |
|---|---|---|---|
| 2007/0009797 A1* | 1/2007 | Takami | H01M 2/1077 429/231.1 |
| 2007/0166607 A1 | 7/2007 | Okada et al. | |
| 2008/0241666 A1* | 10/2008 | Baba | H01M 4/505 429/158 |
| 2009/0042095 A1* | 2/2009 | Inagaki | C01G 23/005 429/92 |
| 2009/0202892 A1* | 8/2009 | Inagaki | H01M 4/485 429/92 |
| 2011/0086248 A1* | 4/2011 | Nakura | H01M 2/0267 429/9 |
| 2012/0225346 A1* | 9/2012 | Hoshina | H01M 4/485 429/156 |

FOREIGN PATENT DOCUMENTS

| | | |
|---|---|---|
| JP | 2007-220658 | 8/2007 |
| JP | 2011-205827 | * 10/2011 |
| JP | 2013-37862 | 2/2013 |
| WO | WO 2015/059746 A1 | 4/2015 |

OTHER PUBLICATIONS

Machine translation of the abstract of JP 2011-205827, published on Oct. 13, 2011 (Year: 2011).*
Machine translation of JP 2011-205827, published on Oct. 13, 2011 (Year: 2011).*
Written Opinion dated Dec. 8, 2015 in PCT/JP2015/076311, filed on Sep. 16, 2015.

* cited by examiner

*Primary Examiner* — Anca Eoff
(74) *Attorney, Agent, or Firm* — Oblon, McClelland, Maier & Neustadt, L.L.P.

(57) ABSTRACT

A battery module according to one embodiment includes a first battery unit including a first nonaqueous electrolyte battery, and a second battery unit electrically connected in series to the first battery unit and including a second nonaqueous electrolyte battery. Each of the first and second nonaqueous electrolyte batteries includes a negative electrode including a spinel-type lithium titanate. The first nonaqueous electrolyte battery includes a positive electrode including at least one olivine-type lithium phosphate. The second nonaqueous electrolyte battery includes a positive electrode including at least one lithium-containing composite oxide. The discharge capacity ratio Ca/Cb between the first battery unit and the second battery unit satisfy $1.5 < Ca/Cb \le 50$.

16 Claims, 7 Drawing Sheets

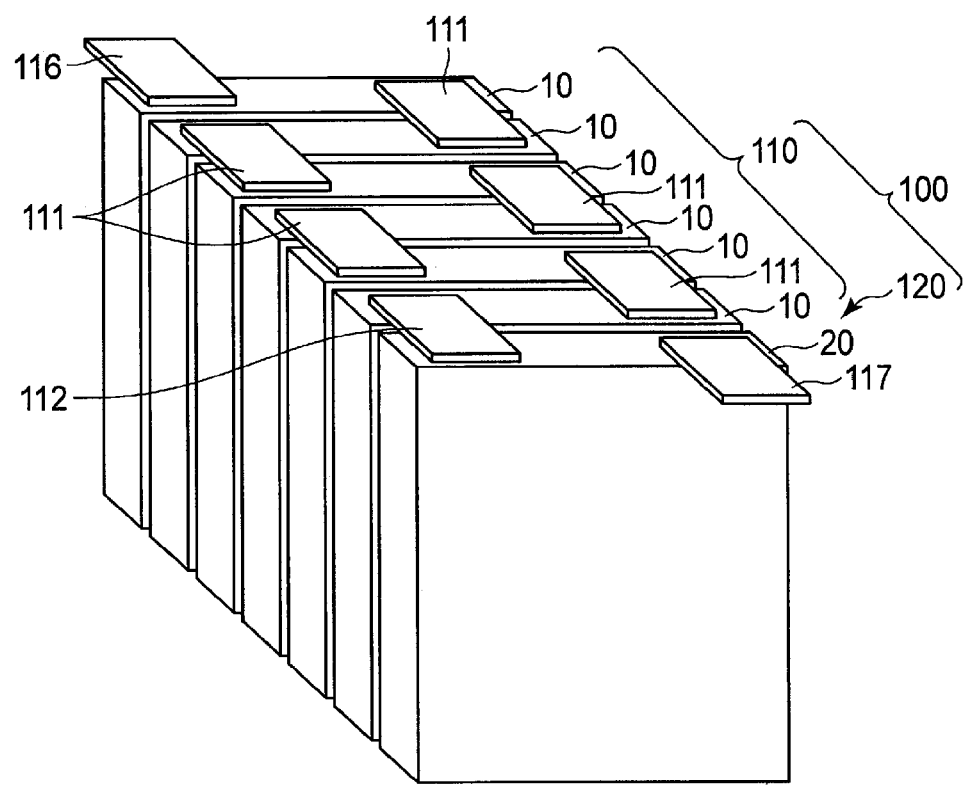
F I G. 1

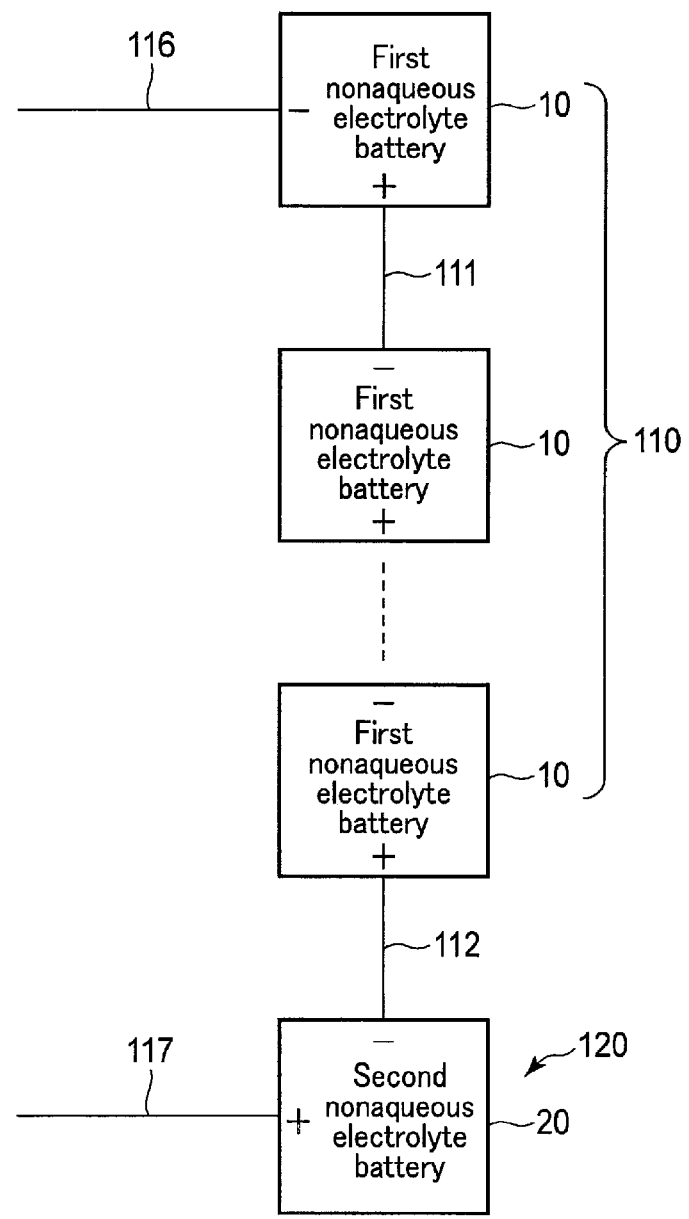
F I G. 2

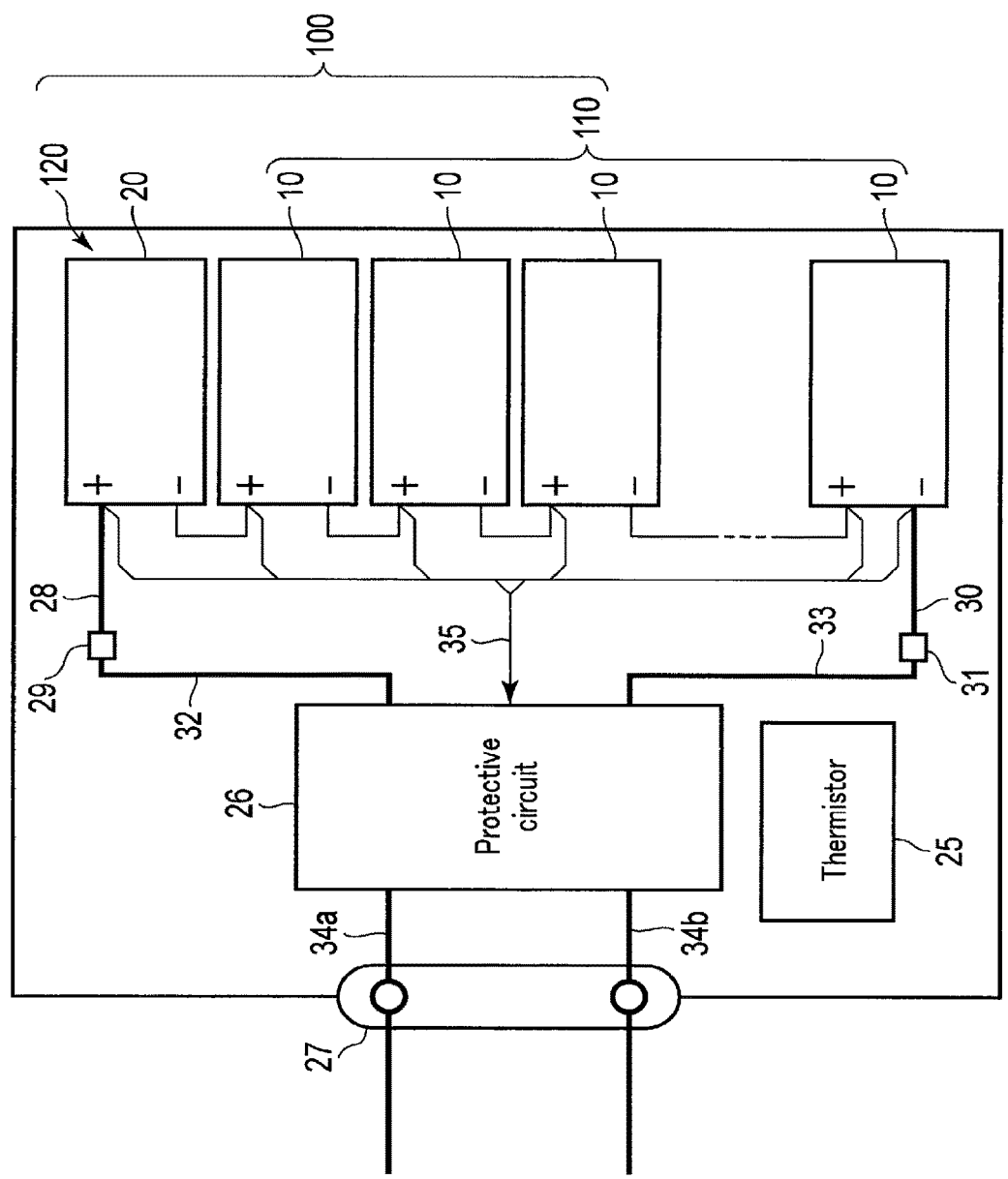
F I G. 8

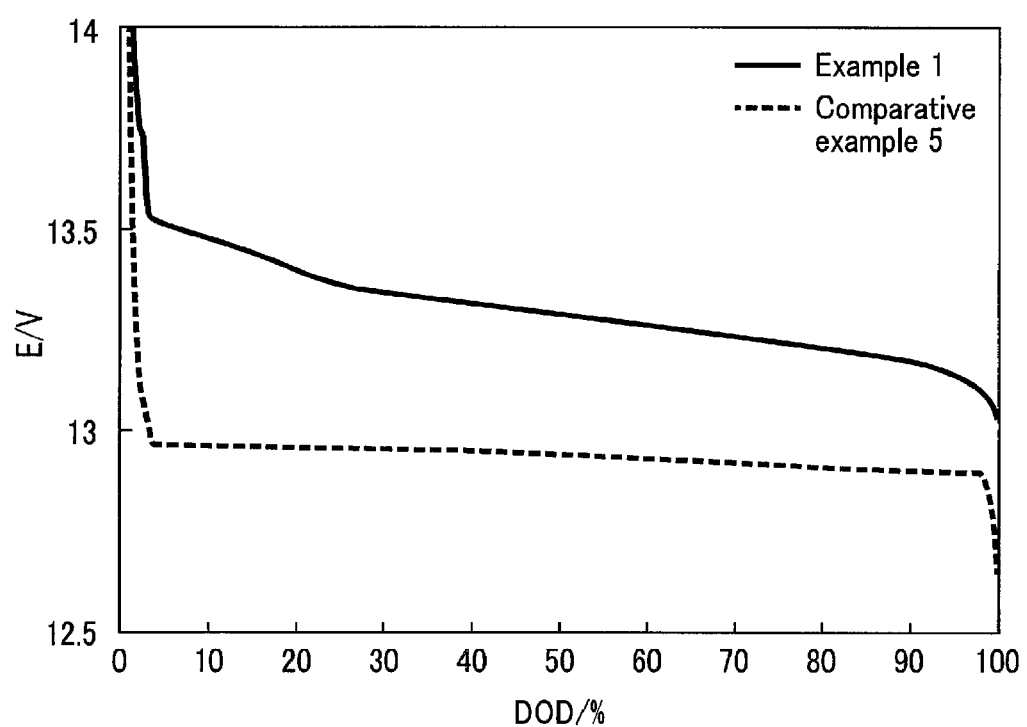
F I G. 9

BATTERY MODULE, BATTERY PACK AND VEHICLE

CROSS-REFERENCE TO RELATED APPLICATIONS

This application is a Continuation Application of PCT Application No. PCT/JP2015/076311, filed Sep. 16, 2015, the entire contents of which are incorporated herein by reference.

FIELD

Embodiments of the present invention relate to a battery module, a battery pack and a vehicle.

BACKGROUND

A nonaqueous electrolyte battery in which charge and discharge are performed by migration of lithium ions between a negative electrode and a positive electrode is actively researched as a high energy-density battery.

In addition to the use as a power supply for small electronic devices, the nonaqueous electrolyte battery is expected to be used as a medium to large power supply such as in-vehicle use or stationary use. For such a medium to large-scale use, the nonaqueous electrolyte battery is required to exhibit excellent life characteristics and a high-level safety.

Examples of candidates for positive electrode active materials for nonaqueous electrolyte batteries that can exhibit excellent life characteristics and high-level safety include olivine-type compounds such as an olivine-type lithium-iron phosphate and an olivine-type lithium-manganese phosphate. On the other hand, examples of candidates for negative electrode active materials include a spinel-type lithium titanate.

BRIEF DESCRIPTION OF THE DRAWINGS

FIG. 1 is a schematic perspective view of an example of a battery module according to a first embodiment;

FIG. 2 is a block diagram showing an electric circuit of the battery module in FIG. 1.

FIG. 8 is a block diagram showing an electric circuit of the battery pack in FIG. 7; and FIG. 9 shows discharge curves of a battery module of Example 1 and a battery module of Comparative Example 5.

DETAILED DESCRIPTION

Figure 3:
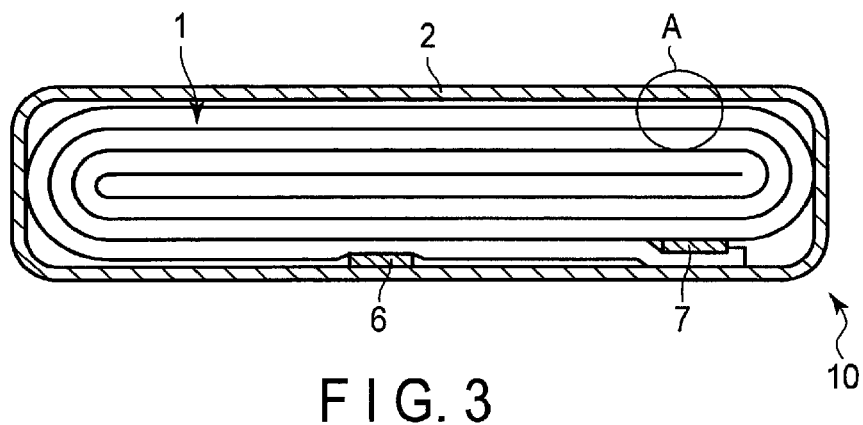
FIG. 3 is a schematic cross-sectional view of a first nonaqueous electrolyte battery included in the battery module in FIG. 1.

In general, according to one embodiment, a battery module is provided. The battery module includes a first battery unit and a second battery unit that is electrically connected in series to the first battery unit. The first battery unit includes a n first nonaqueous electrolyte battery, wherein n is an integer of 1 or more. The first nonaqueous electrolyte battery includes a negative electrode including a spinel-type lithium titanate, a positive electrode including at least one olivine-type lithium phosphate and a first nonaqueous electrolyte. The olivine-type lithium phosphate is represented by a formula of $LiM_APO_4$, wherein $M_A$ is at least one metal element selected from the group consisting of Mn, Fe, Co, Ni, Mg and Ti. The second battery unit includes a m second nonaqueous electrolyte battery, wherein m is an integer of 1 or more. The second nonaqueous electrolyte battery includes a negative electrode including a spinel-type lithium titanate, a positive electrode including at least one lithium-containing composite oxide, and a second nonaqueous electrolyte. The lithium-containing composite oxide is represented by a formula of $LiM_BO_2$, wherein $M_B$ is at least one metal element selected from the group consisting of Mn, Co and Ni. A discharge capacity Ca of the first battery unit and a discharge capacity Cb of the second battery unit satisfy a relational expression of $1.5<Ca/Cb\leq50$. The discharge capacity Ca is a capacity [Ah] obtained by subtracting a capacity Cm [Ah] of the battery module from a discharge capacity C1 [Ah] obtained by discharging the first battery unit of the battery module in a state-of-charge of 100% to a voltage of $1.5\times n$ V at a constant current value of 0.2 C. The discharge capacity Cb is a capacity [Ah] obtained by subtracting the capacity Cm [Ah] of the battery module from a discharge capacity C2 [Ah] obtained by discharging the second battery unit of the battery module in the state-of-charge of 100% to a voltage of $1.5\times m$ V at a constant current value of 0.2 C.

According to the embodiment, a battery pack including the battery module according to the embodiment is provided.

According to the embodiment, a vehicle is provided. This vehicle includes the battery pack according to the embodiment.

The embodiments will be explained below with reference to the drawings. Should be noted that the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to a first embodiment, a battery module is provided. The battery module includes a first battery unit and a second battery unit that is electrically connected in series to the first battery unit. The first battery unit includes a n first nonaqueous electrolyte battery, wherein n is an integer of 1 or more. The first nonaqueous electrolyte battery includes a negative electrode including a spinel-type lithium titanate, a positive electrode including at least one olivine-type lithium phosphate and a first nonaqueous electrolyte. The olivine-type lithium phosphate is represented by a formula of $LiM_APO_4$, wherein $M_A$ is at least one metal element selected from the group consisting of Mn, Fe, Co, Ni, Mg and Ti. The second battery unit includes a m second nonaqueous electrolyte battery, wherein m is an integer of 1 or more. The second nonaqueous electrolyte battery includes a negative electrode including a spinel-type lithium titanate, a positive electrode including at least one lithium-containing composite oxide, and a second nonaqueous electrolyte. The lithium-containing composite oxide is represented by a formula of $LiM_BO_2$, wherein $M_B$ is at least one metal element selected from the group consisting of Mn, Co and Ni. A discharge capacity Ca of the first battery unit and a discharge capacity Cb of the second battery unit satisfy a relational expression of $1.5<Ca/Cb\le50$. The discharge capacity Ca is a capacity [Ah] obtained by subtracting a capacity Cm [Ah] of the battery module from a discharge capacity C1 [Ah] obtained by discharging the first battery unit of the battery module in a state-of-charge of 100% to a voltage of 1.5×n [V] at a constant current value of 0.2 C. The discharge capacity Cb is a capacity [Ah] obtained by subtracting the capacity Cm [Ah] of the battery module from a discharge capacity C2 [Ah] obtained by discharging the second battery unit of the battery module in the state-of-charge of 100% to a voltage of 1.5×m V at a constant current value of 0.2 C.

In order to prolong a life and ensure safety in a battery module and battery pack each including one or more nonaqueous electrolyte batteries, it is preferable that an olivine-type compound such as an olivine-type lithium-iron phosphate or an olivine-type lithium manganese phosphate is used as a positive electrode active material, and a spinel-type lithium titanate is used as a negative electrode active material. However, each of the charge-and-discharge curves of the olivine-type compound includes a flat region in which a change in potential accompanying a change in a state-of-charge is small within a range of the state-of-charge of about 5% to 95%. Each of the charge-and-discharge curves of the spinel-type lithium titanate also includes a flat region in which a change in potential accompanying a change in a state-of-charge is small within a range of the state-of-charge of about 3% to 97%. Therefore, in the nonaqueous electrolyte battery using the olivine-type compound as the positive electrode active material and the spinel-type lithium titanate as the negative electrode active material, it is difficult to estimate the state-of-charge within a range of about 5% to 95% using a battery voltage as an index. Therefore, in such a battery, it is difficult to stop discharge so that the battery is not over-discharged, for example, during a charge-and-discharge cycle, particularly a charge-and-discharge cycle at a large current. When discharge cannot be stopped in the state-of-charge where the discharge should be fundamentally stopped, the deterioration of the battery may be promoted.

On the other hand, each of the charge-and-discharge curves of the lithium-containing composite oxide containing Li and at least one metal element selected from the group consisting of Co, Mn and Ni can include a region in which a change in potential accompanying a change in a state-of-charge is large in the state-of-charge of about 0% to 100%. Therefore, in the nonaqueous electrolyte battery using the lithium-containing composite oxide as the positive electrode active material, it is easy to estimate the state-of-charge within a range of about 0% to 100% using a battery voltage as an index.

However, the above-described lithium-containing composite oxide has a problem that deterioration is apt to occur. In particular, the above-described lithium-containing composite oxide tends to be remarkably deteriorated in an over-charged state.

Although the battery module according to the first embodiment includes a first nonaqueous electrolyte battery including a negative electrode including a spinel-type lithium titanate and a positive electrode including an olivine-type lithium phosphate $LiM_APO_4$, it is possible to estimate the state-of-charge within a range of about 0% to 100% using a battery voltage as an index in the battery module. Furthermore, although the battery module according to the first embodiment includes a second nonaqueous electrolyte battery including a positive electrode including at least one lithium-containing composite oxide $LiM_BO_2$ which is a composite oxide having a layered structure and containing, for example, Li and at least one metal element selected from the group consisting of Co, Mn and Ni, it is possible to prevent the second nonaqueous electrolyte battery from being over-charged, to allow the deterioration of at least one lithium-containing composite oxide $LiM_BO_2$ to be suppressed. As results, the battery module according to the first embodiment can exhibit excellent life characteristics. These reasons will be described in detail below.

First, the spinel-type lithium titanate similarly included in the negative electrode included in each of the first nonaqueous electrolyte battery and the second nonaqueous electrolyte battery, that is, a lithium titanate having a spinel crystal structure can be represented, for example, by a composition formula of $Li_{4+x}Ti_5O_{12}$ (x varies within a range of $0\le x\le3$ depending on the state-of-charge). Such a spinel-type lithium titanate has Li-inserting-and-extracting potential of about 1.5 V based on metal lithium, and Li can be inserted into and extracted from the spinel-type lithium titanate at a higher potential than that of a carbon-based material. Therefore, the spinel-type lithium titanate can prevent the precipitation of metal lithium such as lithium dendrite even when subjected to rapid charge and discharge. Unlike the carbon-based material, the spinel-type lithium titanate is so small that a change in volume upon insertion of lithium is negligible. Therefore, the first nonaqueous electrolyte battery and second nonaqueous electrolyte battery each including the spinel-type lithium titanate can exhibit excellent life characteristics and safety.

At least one olivine-type lithium phosphate $LiM_APO_4$ included in the positive electrode included in the first nonaqueous electrolyte battery has a crystal structure including a stable $PO_4$ tetrahedral structure, so that the crystal structure can be maintained in a stable state even when the insertion and extraction of lithium are repeated. In the crystal structure, P strongly covalently-bonded to O, which makes it difficult to extract oxygen even in an over-discharged state. Therefore, the olivine-type lithium phosphate $LiM_APO_4$ can be said to be a safe positive electrode active material. Therefore, the first nonaqueous electrolyte battery including the at least one olivine-type lithium phosphate $LiM_APO_4$ can exhibit excellent life characteristics and safety.

Furthermore, the battery module according to the first embodiment includes the first battery unit including the first nonaqueous electrolyte battery and the second battery unit including the second nonaqueous electrolyte battery so that the capacity ratio Ca/Cb is within a range of $1.5<Ca/Cb\le50$. This can sufficiently increase the change in the battery voltage [V] of the entire battery module accompanying the change in the state-of-charge within a state-of-charge range of about 0% to 100% in the discharge curve for the entire battery module as compared with that of the battery module not including the second nonaqueous electrolyte battery.

The battery module according to the first embodiment includes the first battery unit including the first nonaqueous electrolyte battery and the second battery unit including the second nonaqueous electrolyte battery so that the capacity ratio Ca/Cb is within the range of $1.5<Ca/Cb\le50$. This can increase the change in the battery voltage [V] of the entire battery module accompanying the change in the state-of-charge within the state-of-charge range of about 0% to 100% in the charge curve for the entire battery module as compared with that of the battery module not including the second nonaqueous electrolyte battery.

Due to these, in the battery module according to the first embodiment, either in a state-of-charge close to the end of discharge or in a state-of-charge close to the end of charge, the change in the state-of-charge can be grasped by using the voltage [V] of the entire battery module as an index. Therefore, the battery module according to the first embodiment can be prevented from reaching a state-of-charge in which the deterioration of the first nonaqueous electrolyte battery may be promoted, and reaching a state-of-charge in which the deterioration of the second nonaqueous electrolyte battery may be promoted, and thereby can exhibit excellent life characteristics.

In a single nonaqueous electrolyte battery in which a negative electrode including a spinel-type lithium titanate is combined with a positive electrode including both at least one olivine-type lithium phosphate $LiM_APO_4$ and at least one lithium-containing composite oxide $LiM_BO_2$, the potential of the olivine-type lithium phosphate $LiM_APO_4$ and the potential of the lithium-containing composite oxide $LiM_BO_2$ during charge and discharge cannot be individually adjusted. Therefore, such a battery cannot prevent the over-discharge of the olivine-type lithium phosphate $LiM_APO_4$ and the over-charge of the lithium-containing composite oxide $LiM_BO_2$.

In the battery module according to the first embodiment, both the negative electrode included in the first nonaqueous electrolyte battery and the negative electrode of the second nonaqueous electrolyte battery include a spinel-type lithium titanate. Thus, the first nonaqueous electrolyte battery and the second nonaqueous electrolyte battery can include the same negative electrode active material. On the other hand, when the negative electrode included in the first nonaqueous electrolyte battery includes a spinel-type lithium titanate, and the negative electrode of the second nonaqueous electrolyte battery includes a carbon material such as graphite or hard carbon or a silicon compound each of which greatly differs from the spinel-type lithium titanate in view of lithium-inserting-and-extracting potentials, the improvement effect of life characteristics is not observed even if the capacity ratio Ca/Cb of the first battery unit and second battery unit is within the range of 1.5<Ca/Cb≤50. This is considered to be because a nonaqueous electrolyte battery using a carbon material, a silicon compound or the like in a negative electrode is apt to be deteriorated when the nonaqueous electrolyte is used in a state-of-charge in the vicinity of 0% SOC or 100% SOC, and a load is apt to be applied to the second battery unit even if the ratio Ca/Cb is within the range of 1.5<Ca/Cb≤50. It is consider that as a result of this, the voltage change at the end of discharge of the second nonaqueous electrolyte battery included in the second battery unit is increased, and the second nonaqueous electrolyte battery is apt to be over-discharged.

As for the battery module in which the ratio Ca/Cb of the capacity Ca of the first battery unit to the capacity Cb of the second battery unit is smaller than 1.5, when the battery module is subjected to a large-current discharge, the state-of-charge of the battery module is sharply decreased. At this time, the resistance of the first nonaqueous electrolyte battery included in the first battery unit is sharply increased. In the first nonaqueous electrolyte battery, the voltage is sharply decreased when the resistance is sharply increased by applying a current. As a result, the deterioration of the first nonaqueous electrolyte battery is promoted.

On the other hand, in the battery module in which the ratio Ca/Cb of the capacity Ca of the first battery unit to the capacity Cb of the second battery unit is larger than 50, the difference in battery capacity is large, which makes it difficult to match the resistance values of the first battery unit and second battery unit. When the difference in the resistance value is large, the shift of the state-of-charge is apt to occur between the first battery unit and the second battery unit during charge and discharge of the battery module. This promotes the deterioration. A battery module in which the ratio Ca/Cb of the capacity of the first battery unit Ca to the capacity Cb of the second battery unit is larger than 50 is not preferable also from the viewpoint of an energy density.

The ratio Ca/Cb of the capacity Ca of the first battery unit to the capacity Cb of the second battery unit is preferably within a range of 5<Ca/Cb≤30. The battery module in which the ratio Ca/Cb is within the range can exhibit excellent life characteristics without significantly decreasing an energy density. A more preferred range is 8<Ca/Cb≤20.

The discharge capacities Ca and Cb are measured according to the following procedure. First, the state-of-charge of the battery module is set to 100%. Here, the battery module having a state-of-charge of 100%, that is, SOC (state-of-charge) 100% means the battery module in a state which is achieved by subjecting the battery to charge at a constant current of 0.2 C to a rated voltage of the battery module under a temperature environment of 25° C., and then subjecting the battery to charge at a constant voltage for 5 hours.

Next, the capacity Cm [Ah] of the battery module is measured. The capacity Cm [Ah] of the battery module is a discharge capacity when the battery module is discharged to a rated discharge cut-off voltage at a constant current value of 0.2 C with respect to the rated capacity of the battery module under an environment of 25° C.

Next, the state-of-charge of the battery module is set to 100% by the same method as above. Next, the battery module is disassembled and divided into the first battery unit and the second battery unit, and the battery units are taken out.

Next, the taken-out first battery unit is discharged to a voltage of 1.5×n V at a constant current value of 0.2 C with respect to the capacity Cm of the battery module under a temperature environment of 25° C. Here, n is the number of first nonaqueous electrolyte batteries included in the first battery unit and connected in series to each other. In the case where the first battery unit includes only one first nonaqueous electrolyte battery, n=1. The discharge capacity during the discharge is defined as C1 [Ah]. The capacity obtained by subtracting the capacity Cm [Ah] of the battery module from the discharge capacity C1 is defined as a capacity Ca [Ah] of the first battery unit.

Meanwhile, the taken-out second battery unit is discharged to a voltage of 1.5×m V at a constant current value of 0.2 C with respect to the capacity Cm of the battery module under a temperature environment of 25° C. Here, m is the number of second nonaqueous electrolyte batteries included in the second battery unit and connected in series to each other. In the case where the second battery unit includes only one second nonaqueous electrolyte battery, m=1. The discharge capacity during the discharge is defined as C2 [Ah]. The capacity obtained by subtracting the capacity Cm [Ah] of the battery module from the discharge capacity C2 is defined as a capacity Cb [Ah] of the second battery unit.

The capacity Ca [Ah] of the first battery unit can be adjusted by the parallel number of the first nonaqueous electrolyte batteries included in the first battery unit and the capacity of each battery. The capacity of the first nonaqueous electrolyte battery can be adjusted, for example, by compositely combining the type and content of the positive electrode active material in the positive electrode layer, the type and content of the negative electrode active material in the negative electrode layer, and the weights of the positive electrode layer and the negative electrode layer included per one battery. For example, in the case of a wound-type electrode group, the weights of the positive electrode layer and negative electrode layer included per one battery can be changed by adjusting the winding length of the electrode group included per one battery. Alternatively, in the case of a stack-type electrode group, the weights of the positive electrode layer and negative electrode layer included per one battery can be changed by adjusting the number of layers included per one battery. As with the first battery unit Ca, the capacity Cb [Ah] of the second battery unit can also be adjusted by the parallel number of the second nonaqueous electrolyte batteries included in the second battery unit and the capacity of each battery. The capacity of the second nonaqueous electrolyte battery can be adjusted in the same manner as that of the first nonaqueous electrolyte battery.

The battery module including the first battery unit and the second battery unit so that the capacity ratio Ca/Cb is within the range of $1.5<Ca/Cb\leq50$ can be manufactured by, for example, adjusting the state-of-charge of each battery unit when the first battery unit and the second battery unit are combined to form the battery module. As a specific example, the battery module including the first battery unit and the second battery unit so that the capacity ratio Ca/Cb is within the range of $1.5<Ca/Cb\leq50$ according to the procedure described in Examples described below can be manufactured.

In the battery module according to the first embodiment, it is preferable that the open circuit voltage (OCV) of the second battery unit is 2.5 V or less in a state where the state-of-charge is 100%. Such a battery module can further suppress the deterioration of the second nonaqueous electrolyte battery included in the second battery unit. The second nonaqueous electrolyte battery having an open circuit voltage (OCV) of 2.5 V or less can suppress the oxidative decomposition of a liquid electrolytic in the positive electrode, which can suppress the deterioration. In the state where the state of charge of the battery module is 100%, the open circuit voltage (OCV) of the second battery unit is more preferably 2.3 V or more, and still more preferably from 2.32 V to 2.45 V.

The battery module in which the open circuit voltage (OCV) of the second battery unit is 2.5 V or less in a state where the state-of-charge of the battery module is 100% can be produced according to, for example, the procedure described in Examples described below.

Next, the battery module according to the first embodiment will be described in more detail.

The battery module according to the first embodiment includes a first battery unit and a second battery unit electrically connected in series to the first battery unit.

The first battery unit includes a n (n is an integer of 1 or more) first nonaqueous electrolyte battery. That is, the first battery unit may include one first nonaqueous electrolyte battery, or may include first nonaqueous electrolyte batteries. For example, the first nonaqueous electrolyte batteries can be electrically connected in series.

The first nonaqueous electrolyte battery includes a positive electrode, a negative electrode and a first nonaqueous electrolyte.

The positive electrode can include a positive electrode current collector and a positive electrode layer (a positive electrode active material-containing layer) provided on the positive electrode current collector. The positive electrode layer can be formed on one surface or both surfaces of the positive electrode current collector. The positive electrode current collector can include a part with a surface on which the positive electrode layer is not formed. The part can serve as a positive electrode tab. Alternatively, the positive electrode current collector can be connected to a positive electrode tab which is not a part of the positive electrode current collector.

The negative electrode can include a negative electrode current collector and a negative electrode layer (a negative electrode active material-containing layer) provided on the negative electrode current collector. The negative electrode layer can be formed on one surface or both surfaces of the negative electrode current collector. The negative electrode current collector can include a part with a surface on which the negative electrode layer is not formed. The part can serve as a negative electrode tab. Alternatively, the negative electrode current collector can be connected to a negative electrode tab which is not a part of the negative electrode current collector.

The positive electrode and the negative electrode can constitute an electrode group. For example, the positive electrode and the negative electrode can be stacked while the separator is provided between the positive electrode layer and the negative electrode layer. The electrode group can have a stack-type structure in which the positive electrodes and the negative electrodes are stacked as described above. Alternatively, the electrode group can have a wound-type structure which is obtained by stacking the positive electrode and the negative electrode with a separator provided between the positive electrode layer and the negative electrode layer and winding the stack thus obtained. The electrode group can have another structure.

The first nonaqueous electrolyte may be held in the electrode group in a state where the electrode group is impregnated with the first nonaqueous electrolyte.

The first nonaqueous electrolyte battery can further include a container member accommodating the electrode group and the nonaqueous electrolyte. The container member can include a positive electrode terminal electrically connected to the positive electrode and a negative electrode terminal electrically connected to the negative electrode. The container member itself can act as either of the positive electrode terminal or the negative electrode terminal.

The second battery unit includes a m (m is an integer of 1 or more) second nonaqueous electrolyte battery. That is, the second battery unit may include one second nonaqueous electrolyte battery, or may include second nonaqueous electrolyte batteries. The second nonaqueous electrolyte batteries can be electrically connected in series to each other, for example.

The second nonaqueous electrolyte battery includes a positive electrode, a negative electrode and a second nonaqueous electrolyte.

Each of the positive electrode and negative electrode can have the same structure as that in the first nonaqueous electrolyte battery. As in the first nonaqueous electrolyte battery, the positive electrode and the negative electrode can constitute an electrode group. For example, the positive electrode and the negative electrode can be stacked while the separator is provided between the positive electrode layer and the negative electrode layer. The electrode group can have the stack-type structure or the wound-type structure. Alternatively, the electrode group can have another structure. The second nonaqueous electrolyte may be held in the electrode group in a state where the electrode group is impregnated with the second nonaqueous electrolyte.

The second nonaqueous electrolyte battery can further include a container member accommodating the electrode group and the nonaqueous electrolyte. The container member can include a positive electrode terminal electrically connected to the positive electrode and a negative electrode terminal electrically connected to the negative electrode. The container member itself can act as either of the positive electrode terminal or the negative electrode terminal.

Hereinafter, the positive electrode, negative electrode, and first nonaqueous electrolyte included in the first nonaqueous electrolyte battery will be described.

(1) Positive Electrode

The positive electrode current collector is preferably an aluminum foil or an aluminum alloy foil containing at least one element selected from Mg, Ti, Zn, Mn, Fe, Cu, and Si.

The positive electrode layer includes at least one olivine-type lithium phosphate, that is, at least one lithium phosphate having an olivine crystal structure. The olivine-type lithium phosphate is represented by a general formula of $LiM_APO_4$. Here, $M_A$ is at least one metal element selected from the group consisting of Mn, Fe, Co, Ni, Mg and Ti. $M_A$ is preferably at least one metal element selected from the group consisting of Fe, Mn and Mg. In particular, the metal element $M_A$ preferably contains Fe. A preferred specific example is a lithium-iron phosphate (for example, $LiFePO_4$) having an olivine-type crystal structure. The lithium-iron phosphate having an olivine-type crystal structure, among olivine-type lithium phosphates, exhibits high life characteristics during a high-temperature cycle. Other preferred examples include an olivine-type lithium phosphate represented by the formula of $LiMn_{1-s-t}Fe_sMg_tPO_4$ (0<s, t≤0.2). This olivine-type lithium phosphate has an operating potential of about 4.1 V vs. $Li/Li^+$, which is higher by about 0.7 V vs. $Li/Li^+$ than that of lithium-iron phosphate. By further containing Mg, the charge-and-discharge characteristics of the manganese-containing olivine-type lithium phosphate are improved. The olivine-type lithium phosphate can act as a positive electrode active material in the positive electrode.

The positive electrode layer can include a conductive agent and a binder, as necessary.

The conductive agent that can be included in the positive electrode layer can improve a current-collecting performance and suppress a contact resistance between the active material and current collector. Examples of the conductive agent can include carbonaceous substances such as acetylene black, carbon black, carbon nanofiber, and carbon nanotube. One of the carbonaceous substances can be used alone or a plurality of the carbonaceous substances can be used.

The binder that can be included in the positive electrode layer can have the effect of binding the active material, the conductive agent, and the current collector. Examples of the binder can include polytetrafluoroethylene (PTFE), polyvinylidene fluoride (PVdF), fluorine-based rubber, acrylic resin, and cellulose such as carboxymethyl cellulose.

The contents of the positive electrode active material, conductive agent and binder blended in the positive electrode layer are preferably from 80% by mass to 95% by mass or less, from 3% by mass to 18% by mass, and from 2% by mass or more to 17% by mass, respectively. By setting the amount of the conductive material to 3% by mass or more, the aforementioned effect can be sufficiently exhibited. By setting the amount of the conductive agent to 18% by mass or less, the decomposition of a nonaqueous electrolyte on the surface of the conductive agent in storage at high temperature can be reduced. By setting the content of the binder to 2% by mass or more, sufficient electrode strength is achieved. By setting the amount of the binder to 17% by mass or less, the blending amount of the binder as an insulating material in the positive electrode can be reduced in such a manner that internal resistance can be reduced.

The positive electrode can be produced by, for example, the following procedures. At first, a positive electrode active material and, as necessary, a conductive agent and a binder are suspended in a solvent to prepare a slurry. The slurry is applied to one surface or both surfaces of a current collector. At this time, a portion can be left uncoated with the slurry. And then, the coated film is dried to obtain a positive electrode layer. And then, the positive layer is subjected to a pressing. Thus, the positive electrode can be obtained. Alternatively, a positive electrode active material, a conductive agent, and a binder are formed into pellets, and then the pellets can be provided on the positive electrode current collector to produce the positive electrode.

(2) Negative Electrode

The negative electrode current collector is preferably formed of aluminum foil, or aluminum alloy foil containing an element such as Mg, Ti, Zn, Mn, Fe, Cu, and Si. The aluminum foil and the aluminum alloy foil is electrochemically stable at a potential within a range higher than 1.0 V (vs. $Li/Li^+$).

The negative electrode layer can include a spinel-type lithium titanate. The spinel-type lithium titanate can be represented by the composition formula of $Li_{4+z}Ti_5O_{12}$. The index z varies within a range of 0≤z≤3 depending on the state-of-charge. In the spinel-type lithium titanate, for example, a part of Ti may be substituted by the other element. Examples of the substitutional element include Al and Nb. The spinel-type lithium titanate can act as a negative electrode active material in the negative electrode.

The negative electrode layer can include a conductive agent and a binder as necessary. As the conductive agent and binder which can be included in the negative electrode layer, the same can be used as those in the positive electrode layer.

As for the blending ratio of the negative electrode active material, the conductive agent, and the binder, the contents are preferably within a range of 70% by mass or more and 96% by mass or less for the negative electrode active material, 2% by mass or more and 28% by mass or less for the conductive agent, and 2% by mass or more and 28% by mass or less for the binder. When the contents of the conductive agent and the binder are 2% by mass or more, the excellent balance between the current-collecting performance of the negative electrode layer and the adhesion of the negative electrode layer and the negative electrode current collector can be achieved, and thus a nonaqueous electrolyte battery that can exhibit excellent large-current characteristics and excellent cycle characteristics can be achieved. The other hand, from the viewpoint of higher capacities, the conductive agent and the binder are each preferably 28% by mass or less.

The negative electrode can be produced by, for example, the following procedures. At first, a negative electrode active material and, as necessary, a conductive agent and a binder are suspended in a solvent to prepare a slurry. The slurry is applied to one surface or both surfaces of a negative electrode current collector. At this time, a portion can be left uncoated with the slurry. And then, the coated film is dried to obtain a negative electrode layer. And then, the negative layer is subjected to a pressing. Thus, the negative electrode can be obtained. Alternatively, a negative electrode active material, a conductive agent, and a binder are formed into pellets, and then the pellets can be provided on the negative electrode current collector to produce the negative electrode.

(3) First Nonaqueous Electrolyte

The first nonaqueous electrolyte may be, for example, a liquid nonaqueous electrolyte or gel nonaqueous electrolyte. The liquid nonaqueous electrolyte is prepared by dissolving an electrolyte in an organic solvent. The concentration of the electrolyte is preferably within a range of 0.5 mol/L to 2.5 mol/L. The gel nonaqueous electrolyte can be prepared by mixing a liquid nonaqueous electrolyte and a polymer material to obtain a composite.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$]. One electrolyte of these electrolytes can be used alone, or two or more electrolytes of these electrolytes can be used in mixture. The electrolyte preferably includes $LiPF_6$.

Examples of the organic solvent include a cyclic carbonate such as propylene carbonate (PC), ethylene carbonate (EC), or vinylene carbonate; a chain carbonate such as diethyl carbonate (DEC), dimethyl carbonate (DMC), or methyl ethyl carbonate (MEC); a cyclic ether such as tetrahydrofuran (THF), 2-methyl tetrahydrofuran (2MeTHF), or dioxolane (DOX); a chain ether such as dimethoxy ethane (DME) or diethoxy ethane (DEE); γ-butyrolactone (GBL), α-methyl γ-butyrolactone (MBL), acetonitrile (AN), and sulfolane (SL). One of these organic solvents can be used alone or two or more solvent can be used as a mixed solvent.

More preferred examples of organic solvent include a mixed solvent which is prepared by mixing two or more solvent selected from the group consisting of propylene carbonate (PC), ethylene carbonate (EC), diethyl carbonate (DEC), and methyl ethyl carbonate (MEC), and a mixed solvent including γ-butyrolactone (GBL). By using such a mixed solvent, a nonaqueous electrolyte battery which is excellent in low-temperature characteristics can be obtained.

Examples of the polymer material can include polyvinylidene fluoride (PVdF), polyacrylonitrile (PAN), and polyethylene oxide (PEO).

Next, the positive electrode, negative electrode, and second nonaqueous electrolyte included in the second nonaqueous electrolyte battery will be described.

(A) Positive Electrode

As the positive electrode current collector, the same one as that of the first nonaqueous electrolyte battery can be used.

The positive electrode layer includes at least one lithium-containing composite oxide. The lithium-containing composite oxide is represented by a general formula of $LiM_BO_2$. Here, $M_B$ is at least one metal element selected from the group consisting of Mn, Co and Ni. The lithium-containing composite oxide can act as a positive electrode active material in the positive electrode.

The lithium-containing composite oxide $LiM_BO_2$ has a layered structure.

The lithium-containing composite oxide preferably includes a lithium-containing composite oxide represented by a general formula of $LiNi_{1-x-y}Co_xMn_yO_2$ (0<x and y≤0.4).

More preferably, the lithium-containing composite oxide preferably includes a lithium-containing composite oxide represented by $LiNi_{1-x-y}Co_xMn_yO_2$ (0<x and y≤0.3). In addition, the lithium-containing composite oxide may include at least one selected from the group consisting of a lithium-containing nickel-manganese composite oxide (for example, $LiNi_{1-a}Mn_aO_2$ (0<a<1), a lithium-cobalt composite oxide (for example, $LiCoO_2$) and a lithium-manganese composite oxide (for example, $LiMn_2O_4$).

The positive electrode layer may include a positive electrode active material other than the lithium-containing composite oxide $LiM_BO_2$. Examples of the positive electrode active material other than the lithium-containing composite oxide include a spinel-type lithium-manganese composite oxide. It is preferable that the lithium-containing composite oxide occupies 70% or more of the weight of the positive electrode active material included in the positive electrode layer.

The positive electrode layer can include a conductive agent and a binder, as necessary. As the conductive agent and binder that can be included in the positive electrode layer of the second nonaqueous electrolyte battery, the same ones as those can be included in the positive electrode of the first nonaqueous electrolyte battery can be used.

The contents of the positive electrode active material (or the total of the positive active materials, when the positive electrode active material other than the lithium-containing composite oxide is included), conductive agent and binder in the positive electrode layer are preferably from 80% by mass to 95% by mass or less, from 3% by mass to 18% by mass, and from 2% by mass or more to 17% by mass, respectively. By setting the amount of the conductive material to 3% by mass or more, the aforementioned effect can be sufficiently exhibited. By setting the amount of the conductive agent to 18% by mass or less, the decomposition of a nonaqueous electrolyte on the surface of the conductive agent during a storage under a high temperature can be reduced. By setting the content of the binder to 2% by mass or more, sufficient electrode strength can be achieved. By setting the amount of the binder to 17% by mass or less, the blending amount of the binder as an insulating material in the positive electrode can be reduced in such a manner that internal resistance can be reduced.

The positive electrode of the second nonaqueous electrolyte battery can be produced by, for example, the same procedures as for the positive electrode of the first nonaqueous electrolyte battery.

(B) Negative Electrode

As the negative electrode current collector, the same one as that of the first nonaqueous electrolyte battery can be used.

The negative electrode layer can include a spinel-type lithium titanate. The spinel-type lithium titanate can be represented by the composition formula of $Li_{4+z}Ti_5O_{12}$. The index z varies within the range of 0≤z≤3 depending on the state-of-charge. In the spinel-type lithium titanate, for example, a part of Ti may be substituted by the other element. Examples of the substitutional element include Al and Nb. The spinel-type lithium titanate can act as a negative electrode active material in the negative electrode.

The negative electrode layer may further include a titanium-containing oxide other than the spinel-type lithium titanate as a further negative electrode active material. Examples of such a negative electrode active material include titanium-containing oxides such as a monoclinic β-type titanium-containing oxide, an anatase-type titanium-containing oxide, a ramsdelide-type lithium titanate, a monoclinic niobium-titanium composite oxide (for example, $TiNb_2O_7$ and $Ti_2Nb_2O_9$), and an orthorhombic Na-containing niobium-titanium composite oxide (for example, $Li_2Na_{1.8}Ti_{5.8}Nb_{0.2}O_{14}$ and the like).

The negative electrode layer can include a conductive agent and a binder as necessary. As the conductive agent and binder which can be included in the negative electrode layer, the same ones can be used as those in the negative electrode layer of the first nonaqueous electrolyte battery.

As for the blending ratio of the negative electrode active material (or the total of the negative electrode active material, when the negative electrode material other than the spinel-type lithium titanate is included), the conductive agent, and the binder, the contents are preferably within the range of 70% by mass or more and 96% by mass or less for the negative electrode active material, 2% by mass or more and 28% by mass or less for the conductive agent, and 2% by mass or more and 28% by mass or less for the binder. When the amounts of the conductive agent and the binder are set to 2% by mass or more, the excellent balance between the current-collecting performance of the negative electrode layer and the adhesion of the negative electrode layer and the negative electrode current collector can be achieved, and thus a nonaqueous electrolyte battery that can exhibit excellent large-current characteristics and excellent cycle characteristics can be achieved. The other hand, from the viewpoint of higher capacities, the conductive agent and the binder are each preferably set to 28% by mass or less.

The negative electrode of the second nonaqueous electrolyte battery can be produced by, for example, the same procedures as for the negative electrode of the first nonaqueous electrolyte battery.

(3) Second Nonaqueous Electrolyte

As the second nonaqueous electrolyte, the same as the first nonaqueous electrolyte can be used. The second nonaqueous electrolyte may be the same as, or different from the first nonaqueous electrolyte. The second nonaqueous electrolyte is preferably different from the first nonaqueous electrolyte and suitable for each nonaqueous electrolyte battery. In this case, it is preferable that the resistance of the first nonaqueous electrolyte battery is about the same as the resistance of the second nonaqueous electrolyte battery.

Next, the materials of the separator, container member, positive electrode terminal, and negative electrode terminal which can be included in each of the first nonaqueous electrolyte battery and the second nonaqueous electrolyte battery will be described.

(Separator)

As the separator, for example, a porous film formed from a material such as polyethylene, polypropylene, cellulose, and polyvinylidene fluoride (PVdF), nonwoven fabric made of synthetic resin or the like can be used. Among these, a porous film formed from polyethylene or polypropylene is preferably because such a film can be melt at predetermined temperature to cut off current. Further, a separator obtained by applying an inorganic compound to a porous film can also be used.

(Container Member)

As the container member, for example, a bag-like container made of laminate film or a metallic container is used.

As the shape thereof, the flat shape, square shape, cylindrical shape, coin shape, button shape, sheet shape, and stack shape can be cited. Should be noted that in addition to a small battery mounted on mobile electronic devices, the nonaqueous electrolyte battery may also be a large battery mounted on two-wheeled to four-wheeled automobiles or the like.

As the laminate film, for example, a multilayer film in which a metal layer is sandwiched between resin films can be used. The metal layer is preferably aluminum foil or aluminum alloy foil to reduce the weight thereof. The resin film can reinforce the metal layer. As a material for the resin film, for example, a polymeric material such as polypropylene (PP), polyethylene (PE), nylon, and polyethylene terephthalate (PET) can be used. The laminate film can be formed into the shape of a container member by performing heat sealing. The laminated film preferably has a thickness of 0.2 mm or less.

The container made of metal can be formed from, for example, aluminum or an aluminum alloy. The aluminum alloy preferably contains an element such as magnesium, zinc, or silicon. On the other hand, the content of transition metal such as iron, copper, nickel, and chromium is preferably reduced to 100 ppm or less. Whereby, long-term reliability and heat dissipation properties in a high-temperature environment can remarkably be improved. The wall thickness of the container made of metal is preferably 0.5 mm or less and particularly preferably 0.2 mm or less.

(Positive Electrode Terminal)

The positive electrode terminal is preferably formed from a material that is electrically stable at a potential in the range of 3.0 V to 4.5 V with respect to the oxidation-reduction potential of lithium and has conductivity. The positive electrode terminal is preferably formed from aluminum or an aluminum alloy containing an element such as Mg, Ti, Zn, Mn, Fe, Cu, and Si. To reduce contact resistance with the positive electrode current collector, the positive electrode terminal is preferably formed from a material similar to that of the positive electrode current collector.

(Negative Electrode Terminal)

The negative electrode terminal is preferably formed from a material that is electrically stable at a potential in the range of 1.0 V to 3.0 V with respect to the oxidation-reduction potential of lithium and has conductivity. The negative electrode terminal is preferably formed from aluminum or an aluminum alloy containing an element such as Mg, Ti, Zn, Mn, Fe, Cu, and Si. To reduce contact resistance with the negative electrode current collector, the negative electrode terminal is preferably formed from a material similar to that of the negative electrode current collector.

Next, a method of confirming the crystal structures and compositions of the positive electrode active material and negative electrode active material included in each of the first nonaqueous electrolyte battery and the second nonaqueous electrolyte battery will be described.

<Confirmation Method of Crystal Structure>

The crystal structure of the active material included in each battery can be confirmed by X-ray diffraction (XRD) measurement of the active material. Specifically, the confirmation can be performed as follows.

At first, a compound to be measured is put into a state where lithium ions is perfectly extracted from the compound. For example, in the case where the compound to be measured is a compound included in the negative electrode, the battery is put into a completely discharged state. Thus, the crystal structure of the compound can be observed. However, even in a state in which the battery is discharged, lithium ions may remain. Next, the battery is disassembled in a glove box filled with argon and then an electrode is taken out of the disassembled battery. And then, the taken-out electrode is washed with an appropriate solvent. As washing solvent, for example, ethylmethyl carbonate may be used. Next, the washed electrode is cut into a size having the same area of the holder of the X-ray diffractometer to obtain a measurement sample. The sample thus obtained is directly attached to the glass holder, and measuring it. At this time, a position of a peak originated from the current collector such as a metal foil is measured in advance. Furthermore, peaks originated from the other ingredients such as a conductive agent and binder are measured in advance. When the peak of the current collector is overlapped on the peak of the compound to be measured, it is desired to separate the electrode layer including the compound from the current collector, and subject the electrode layer to the measurement. This is to separate the overlapped peaks and to measure the peak intensity quantitatively. For example, the electrode layer can be subjected to the ultrasonic wave in a solvent to separate the electrode layer.

Next, the electrode layer is filled in a capillary, the capillary is loaded on a rotary sample stand, and then measurement is performed. Thereby, the XRD pattern of the active material can be obtained while the influence of orientation can be reduced.

The XRD pattern thus obtained above is analyzed by the Rietveld method. In the Rietveld method, the diffraction pattern is calculated from the crystal structure model which has been previously estimated. The parameters of the crystal structure (lattice constant, atomic coordinate, and occupancy ratio or the like) can be precisely analyzed by fitting all the calculated values and measurement values. Thereby, the characteristics of the crystal structure of the active material to be measured oxide can be determined.

<Conformation Method of Composition>

The composition of the active material included in each battery can be confirmed using inductively coupled plasma (ICP) emission spectroscopy, for example.

<Method of Measuring Open Circuit Voltage OCV of Second Nonaqueous Electrolyte Battery in Battery Module in State-of Charge of 100%>

The open circuit voltage OCV of the second nonaqueous electrolyte battery in the battery module in a state-of-charge of 100% can be measured according to the following procedure. First, the battery module to be measured is subjected to charge at a constant current of 0.2 C to the rated voltage of the battery module under a temperature environment of 25° C. Next, this battery module is subjected to charge at a constant voltage for 5 hours. The battery module in this state is left as an open circuit state for 10 hours. Thereafter, the open circuit voltage of the second nonaqueous electrolyte battery is measured.

Next, a battery module as an example according to the first embodiment will be described with reference to the drawings.

Figure 4:
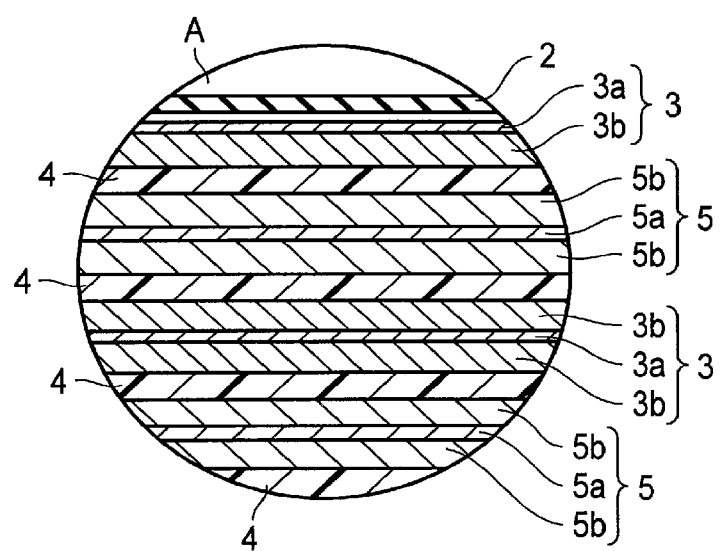
FIG. 4 is an enlarged cross-sectional view of an A portion in FIG. 3.

FIG. 1 is a schematic perspective view of an example of a battery module according to the first embodiment. FIG. 2 is a block diagram showing an electric circuit of the battery module in FIG. 1. FIG. 3 is a schematic cross-sectional view of a first nonaqueous electrolyte battery included in the battery module in FIG. 1. FIG. 4 is an enlarged cross-sectional view of a part A of FIG. 3.

A battery module 100 shown in FIG. 1 includes a first battery unit 110 and a second battery unit 120 electrically connected in series to the first battery unit 110.

As shown in FIGS. 1 and 2, the first battery unit 110 includes six first nonaqueous electrolyte batteries 10.

As shown in FIG. 3, the first nonaqueous electrolyte battery 10 includes a flat wound electrode group 1 and a bag-like container member 2 housing the wound electrode group 1.

As partially shown in FIG. 4, the flat wound electrode group 1 includes a negative electrode 3, a separator 4, and a positive electrode 5. The wound electrode group 1 can be formed by stacking the negative electrode 3, the separator 4, the positive electrode 5, and another separator 4 in this order to form a stack, spirally winding the stack while disposing the negative electrode 3 on the outside, and press-molding the stack.

The negative electrode 3 includes a negative electrode current collector 3a, and a negative electrode layer 3b formed on the negative electrode current collector 3a, as shown in FIG. 4. As shown in FIG. 4, the negative electrode layer 3b is formed only on the surface facing the winding center of the negative electrode current collector 3a in the portion of the negative electrode current collector 3a located at the outermost layer. On the other portion of the negative electrode current collector 3a, the negative electrode layer 3b is formed on both surfaces of the negative electrode current collector 3a. The negative electrode layer 3b includes a spinel-type lithium titanate.

As shown in FIG. 4, the positive electrode 5 includes a positive electrode current collector 5a and a positive electrode layer 5b formed on both surfaces of the positive electrode current collector 5a. The positive electrode layer 5b includes at least one olivine-type lithium phosphate represented by the formula of $LiM_APO_4$ ($M_A$ is at least one metal element selected from the group consisting of Mn, Fe, Co, Ni, Mg and Ti).

As shown in FIG. 3, in the vicinity of the outer peripheral edge of the wound electrode group 1, a negative electrode terminal 6 is connected to the negative electrode current collector 3a in the outermost negative electrode 3, and a positive electrode terminal 7 is connected to the positive electrode current collector 5a in the inside positive electrode 5. The negative electrode terminal 6 and the positive electrode terminal 7 are metallic member each having a band shape. One end of each of the negative electrode terminal 6 and the positive electrode terminal 7 is extended out from the bag-shaped container member 2.

The nonaqueous electrolyte battery 10 shown in FIGS. 3 and 4 can be produced according to the following procedure, for example. First, an electrode group 1 is produced. The electrode group 1 is then enclosed in a bag-shaped container member 2. At this time, one ends of the negative electrode terminal 6 and positive electrode terminal 7 are protruded toward the outside of the container member 2. Next, the circumference of the container member 2 is heat-sealed while a part thereof remains unsealed. Next, for example, a liquid nonaqueous electrolyte is injected via the opening of the bag-shaped container member 2 which is not heat-sealed. Finally, the opening is heat-sealed, and thereby the wound electrode group 1 and the liquid nonaqueous electrolyte are completely sealed.

As shown in FIGS. 1 and 2, the six first nonaqueous electrolyte batteries are electrically connected in series to each other via five busbars 111. As shown in FIG. 1, a negative electrode terminal 6 of one first nonaqueous electrolyte battery 10 is connected to a negative electrode terminal 116 of the battery module 100.

On the other hand, as shown in FIGS. 1 and 2, the second battery unit 120 includes a second nonaqueous electrolyte battery 20. The second nonaqueous electrolyte battery 20 may have a structure similar to that of the first nonaqueous electrolyte battery 10. However, the second nonaqueous electrolyte battery 20 includes a negative electrode including a spinel-type lithium titanate and a positive electrode including at least one lithium-containing composite oxide represented by the formula of $LiM_BO_2$ ($M_B$ is at least one metal element selected from the group consisting of Mn, Co and Ni).

As shown in FIGS. 1 and 2, the second nonaqueous electrolyte battery 20 is electrically connected in series to a first nonaqueous electrolyte battery 10 via a bus bar 112. That is, the first battery unit 110 and the second battery unit 120 are electrically connected in series to each other. As shown in FIG. 1, a positive electrode terminal 7 of the second nonaqueous electrolyte battery 20 is connected to a positive electrode terminal 117 of the battery module 100.

In the battery module 100 shown in FIGS. 1 to 4, the discharge capacity Ca [Ah] of the first battery unit and the discharge capacity Cb [Ah] of the second battery unit satisfy the relational expression: $1.5 < C1/C2 \leq 50$.

Figure 5:
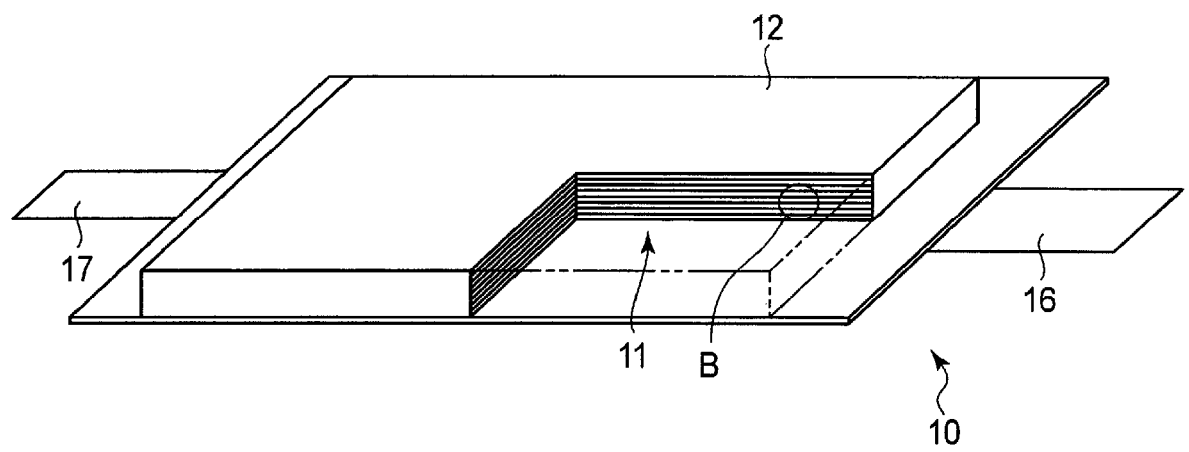
FIG. 5 is a partially cutaway perspective view schematically showing of another example of a nonaqueous electrolyte battery included a battery module according to the first embodiment.
Figure 6:
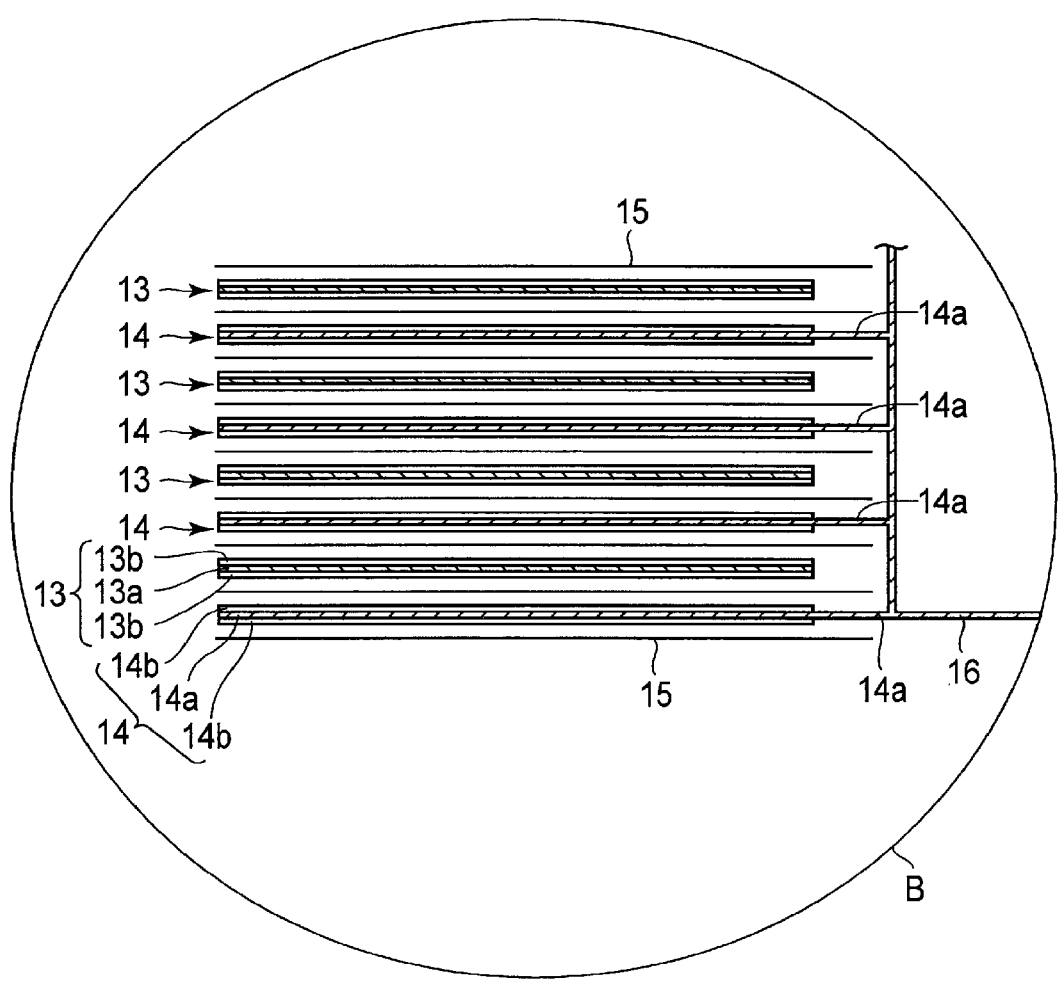
FIG. 6 is an enlarged cross-sectional view of a B portion in FIG. 5.

Each of the first and second nonaqueous electrolyte batteries which is included in the battery module according to the first embodiment is not limited to the nonaqueous electrolyte battery as an example shown in FIGS. 3 and 4, and may be, for example, a battery having a structure shown in FIGS. 5 and 6.

FIG. 5 is a partially cutaway perspective view schematically showing of another example of a nonaqueous electrolyte battery included a battery module according to the first embodiment. FIG. 6 is an enlarged cross-sectional view of a B portion in FIG. 5.

A nonaqueous electrolyte battery 10 shown in FIGS. 5 and 6 includes an electrode group 11 shown in FIGS. 5 and 6, a container member 12 shown in FIG. 5, and a nonaqueous electrolyte (not shown). The electrode group 11 and the nonaqueous electrolyte are accommodated in the container member 12. The nonaqueous electrolyte is held in the electrode group 11.

The container member 12 is made of a laminate film including two resin layers and a metal layer sandwiched between the resin layers.

As shown in FIG. 6, the electrode group 11 is a stack-type electrode group. As shown in FIG. 6, the stack-type electrode group 11 has a structure in which positive electrodes 13 and negative electrodes 14 are alternately stacked with a separator 15 sandwiched therebetween.

The electrode group 11 includes a plurality of positive electrodes 13. Each of the plurality of positive electrodes 13 includes a positive electrode current collector 13a, and a positive electrode layer 13b supported on each of the both surfaces of the positive electrode current collector 13a. The electrode group 11 includes a plurality of negative electrodes 14. Each of the plurality of negative electrodes 14 includes a negative electrode current collector 14a, and a negative electrode layer 14b supported on each of the both surfaces of the negative electrode current collector 14a. A part of the negative electrode current collector 14a of each of the negative electrodes 14 protrudes at one side from the negative electrode 14. The protruded part of the negative electrode current collector 14a is electrically connected to a strip-shaped negative electrode terminal 16. The tip of the strip-shaped negative electrode terminal 16 is extended out from the container member 12. Although not shown in the drawings, a part of the positive electrode current collector 13a of the positive electrode 13 protrudes from the positive electrode 13 at the side opposed to the protruded side of the negative electrode current collector 14a. The protruded part of the positive electrode current collector 13a from the positive electrode 13 is electrically connected to a strip-shaped positive electrode terminal 17. The tip of the strip-shaped positive electrode terminal 17 is opposed to the negative electrode terminal 16, and extended out from a side of the container member 12.

According to the first embodiment, a battery module is provided. The battery module includes a first battery unit including a first nonaqueous electrolyte battery and a second battery unit electrically connected in series to the first battery unit and including a second nonaqueous electrolyte battery. Each of the first and second nonaqueous electrolyte batteries includes a negative electrode including a spinel-type lithium titanate. The first nonaqueous electrolyte battery includes a positive electrode including at least one olivine-type lithium phosphate. The second nonaqueous electrolyte battery includes a positive electrode including at least one lithium-containing composite oxide. A discharge capacity Ca [Ah] of the first battery unit and a discharge capacity Cb [Ah] of the second battery unit satisfy the relational expression of $1.5 < Ca/Cb \leq 50$. Thereby, the battery module according to the first embodiment can be prevented from reaching a state-of-charge in which the deterioration of the first nonaqueous electrolyte battery may be promoted, and reaching a state-of-charge in which the deterioration of the second nonaqueous electrolyte battery may be promoted. As a result, the battery module according to the first embodiment can exhibit excellent life characteristics.

Second Embodiment

According to a second embodiment, the battery pack including the battery module according to the first embodiment is provided.

The battery pack according to the second embodiment may include one or more battery module(s) according to the first embodiment. When the battery pack includes battery modules, the battery modules may be electrically connected in series or in parallel to each other.

Next, a battery pack as an example according to the second embodiment will be described with reference to the drawings.

Figure 7:
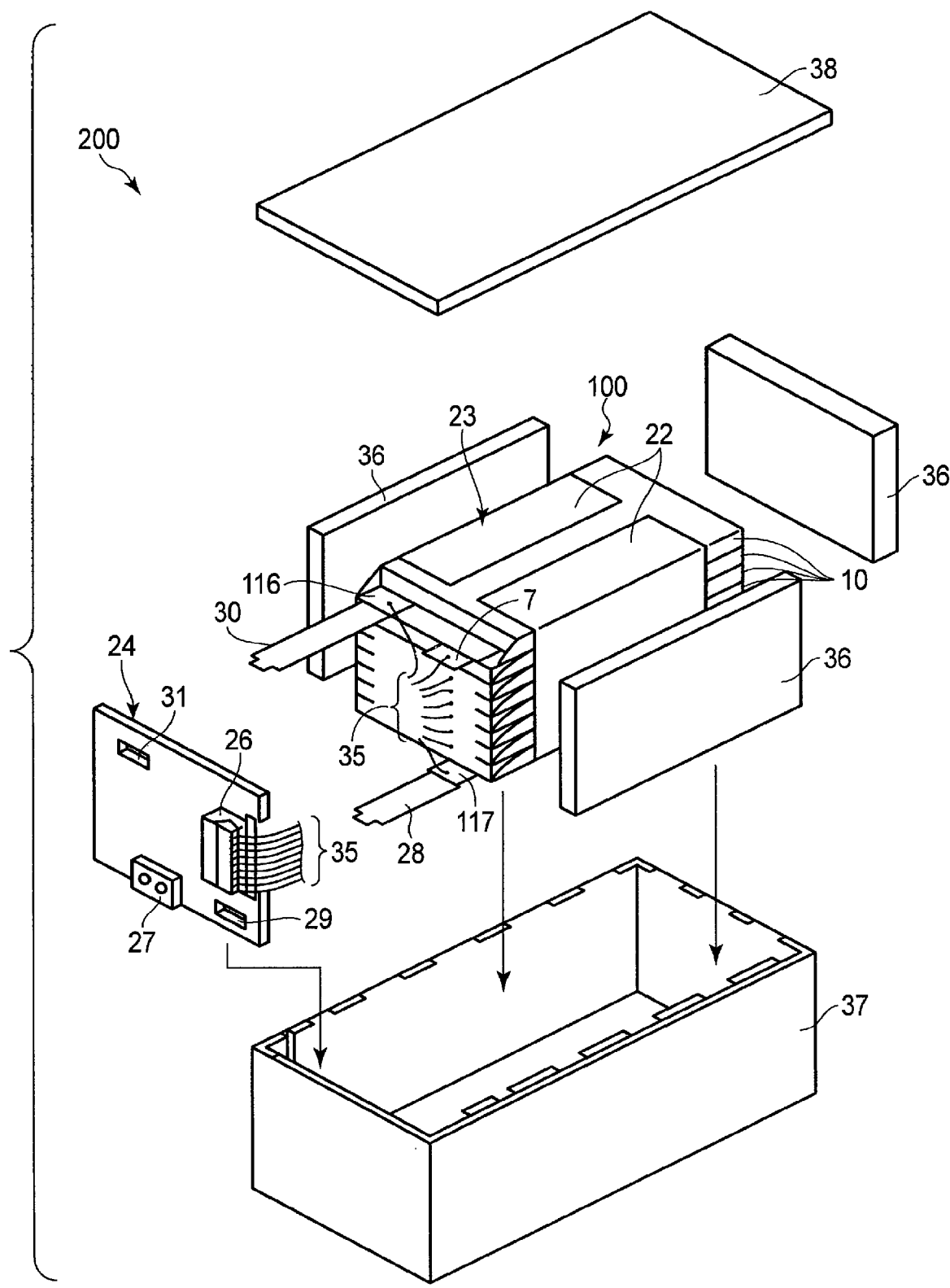
FIG. 7 is a schematic exploded perspective view of an example of a battery pack according to a second embodiment.

FIG. 7 is an exploded perspective view showing one example of a battery pack according to a second embodiment. FIG. 8 is a block diagram showing an electric circuit of the battery pack in FIG. 7.

A battery pack 200 shown in FIGS. 7 and 8 includes a battery module 100. The battery module 100 is the battery module 100 described with reference to FIGS. 1 to 4. Therefore, duplicated descriptions will be omitted.

In the battery module 100, six first nonaqueous electrolyte batteries 10 and one second nonaqueous electrolyte battery 20 are stacked in a state where the negative electrode terminal 6 and positive electrode terminal 7 extending outward are aligned in the same direction, and are fastened with an adhesive tape 22. The first battery unit 110 including the six first nonaqueous electrolyte batteries 10 and the second battery unit 120 including the one second nonaqueous electrolyte battery 20 are electrically connected in series to each other as described with reference to FIGS. 1 and 2, or as shown in FIG. 8.

A printed wiring board 24 is provided so as to face the side plane where the negative electrode terminal 6 and the positive electrode terminal 7 of the unit cell 21 are extended. A thermistor 25, a protective circuit 26, and a power distribution terminal 27 to an external device are mounted on the printed wiring board 24 as shown in FIG. 8. An electric insulating plate (not shown) is attached to the surface of the printed wiring board 24 facing the battery module 100 to avoid unnecessary connection of the wires of the battery module 100.

A positive electrode-side lead 28 is connected to the positive electrode terminal 7 located at the bottom layer of the battery module 100 and the distal end of the lead 28 is inserted into a positive electrode-side connector 29 of the printed wiring board 24 so as to be electrically connected. An negative electrode-side lead 30 is connected to the negative electrode terminal 6 located at the top layer of the battery module 100 and the distal end of the lead 30 is inserted into an negative electrode-side connector 31 of the printed wiring board 24 so as to be electrically connected. The connectors 29 and 31 are connected to the protective circuit 26 through wirers 32 and 33 formed in the printed wiring board 24.

The thermistor 25 detects the temperature of the first nonaqueous electrolyte battery 10 and the second nonaqueous electrolyte battery 20 and the detection signal is sent to the protective circuit 26. The protective circuit 26 can shut down a plus-side wirer 34a and a minus-side wirer 34b between the protective circuit 26 and the power distribution terminal 27 to an external device under a predetermined condition. The predetermined condition indicates, for example, the case where the temperature detected by the thermistor 25 becomes a predetermined temperature or more. Another example of the predetermined condition indicates the case where the over-charge, over-discharge, or over-current of the first nonaqueous electrolyte battery 10 and the second nonaqueous electrolyte battery 20 is detected. The detection of the over-charge and the like is performed on each of the first nonaqueous electrolyte battery 10 and the second nonaqueous electrolyte battery 20 or the whole of the battery module 100. When each of the first nonaqueous electrolyte battery 10 and the second nonaqueous electrolyte battery 20 is detected, the battery voltage may be detected, or positive electrode or negative electrode potential may be detected. In the case of the latter, a lithium electrode to be used as a reference electrode is inserted into each of the first nonaqueous electrolyte battery 10 and the second nonaqueous electrolyte battery 20. In the case of the battery pack 20 of FIGS. 7 and 8, wirer 35 for voltage detection is connected to each of the first nonaqueous electrolyte battery 10 and the second nonaqueous electrolyte battery 20. A detection signal is sent to the protective circuit 26 through the wirer 35.

Protective sheets 36 including rubber or resin are arranged on three side planes of the battery module 100 except the side plane from which the positive electrode terminals 7 and the negative electrode terminals 6 are protruded.

The battery module 100 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the other internal surface in a short side direction. The battery module 100 is located in a space surrounded by the protective sheets 36 and the printed wiring board 24. A lid 38 is attached to the upper surface of the housing case 37.

In order to fix the battery module 100, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

The aspect of the battery pack may be appropriately changed depending on its application. The applications of the battery pack described above are preferably those for which cycle characteristics when large-current is taken out are desired. Specific examples of these applications include application to a vehicle such as a two- or four-wheeled hybrid electric vehicle, a two- or four-wheeled electric vehicle or a power-assisted bicycle. Particularly preferably, the battery pack according to the second embodiment is used for a battery mounted to a vehicle.

The battery pack according to the second embodiment includes the battery module according to the first embodiment. Therefore, the battery pack can exhibit excellent life characteristics.

EXAMPLES

Hereinafter, Examples will be described. However, the present invention is not limited to the following Examples, without departing from the spirit of the present invention.

Example 1

In Example 1, a battery module of Example 1 was produced according to the following procedure.

[Production of First Battery Unit]

(Production of Positive Electrode)

An olivine-type lithium iron phosphate ($LiFePO_4$) as a positive electrode active material was provided. Acetylene black was provided as a conductive agent. Polyvinylidene fluoride (PVdF) was provided as a binder.

The olivine-type lithium phosphate, the acetylene black and the PVdF were mixed at a weight ratio of 90:5:5 to obtain a mixture, and the mixture was put into N-methylpyrrolidone (NMP) as a solvent. Thus, positive electrode slurry was obtained.

This positive electrode slurry was applied to an Al foil having a thickness of 20 μm and dried. By pressing the dried coated film, a positive electrode including a positive electrode layer having a density (not including a current collector) of 2.0 g/cm$^3$ was obtained.

(Production of Negative Electrode)

A spinel-type lithium-titanium composite oxide ($Li_4Ti_5O_{12}$) as a negative electrode active material was provided. Acetylene black was provided as a conductive agent. PVdF was provided as a binder.

The spinel-type lithium titanium composite oxide, the acetylene black and the PVdF were mixed at a weight ratio of 90:5:5 to obtain a mixture, and the mixture was put into NMP as a solvent. Thus, negative electrode slurry was obtained.

This negative electrode slurry was applied to an Al foil having a thickness of 20 μm and dried. By pressing the dried coated film, a negative electrode including a negative electrode layer having a density (not including a current collector) of 2.0 g/cm$^3$ was obtained.

(Preparation of Nonaqueous Electrolyte)

Lithium hexafluorophosphate ($LiPF_6$) was dissolved at a concentration of 1.0 mol/L in a mixed solvent prepared by mixing propylene carbonate (PC) and methylethyl carbonate (EMC) as a nonaqueous solvent at a volume ratio of 1:2, to prepare a nonaqueous electrolyte.

(Assembly of First Nonaqueous Electrolyte Battery)

A polyethylene separator having a thickness of 20 μm was provided as a separator. The negative electrode produced above, the separator, and the positive electrode produced above, and another separator were stacked in this order to obtain a stack. The stack thus obtained was wound with the negative electrode disposed on the outside until the battery capacity reached 3.4 Ah, and pressed into a flat shape. Thus, an electrode group was obtained. A positive electrode terminal was connected to the positive electrode of this electrode group, and a negative electrode terminal was connected to the negative electrode.

This electrode group was housed in a container of a metal can. Also, the nonaqueous electrolyte prepared above was poured into the container and sealed. Thus, a first nonaqueous electrolyte battery having a capacity of 3.4 Ah was obtained.

(Assembly of First Battery Unit)

The same procedure was repeated to produce a total of six first nonaqueous electrolyte batteries. Next, the six first nonaqueous electrolyte batteries were electrically connected in series to each other. Thus, a first battery unit was assembled.

[Production of Second Battery Unit]

(Production of Positive Electrode)

A lithium-cobalt-nickel-manganese composite oxide (LiNi$_{0.33}$Co$_{0.33}$Mn$_{0.33}$O$_2$) as a positive electrode active material was provided. Acetylene black was provided as a conductive agent. PVdF was provided as a binder.

The lithium-cobalt-nickel-manganese composite oxide, the acetylene black and the PVdF were mixed at a weight ratio of 90:5:5 to obtain a mixture, and the mixture was put into NMP as a solvent. Thus, positive electrode slurry was obtained.

This positive electrode slurry was applied to an Al foil having a thickness of 20 μm and dried. By pressing the dried coated film, a positive electrode including a positive electrode layer having a density (not including a current collector) of 3.2 g/cm$^3$ was obtained.

(Production of Negative Electrode)

A spinel-type lithium-titanium composite oxide (Li$_4$Ti$_5$O$_{12}$) as a negative electrode active material was provided. Acetylene black was provided as a conductive agent. PVdF was provided as a binder.

The spinel-type lithium-titanium composite oxide, the acetylene black and the PVdF were mixed at a weight ratio of 90:5:5 to obtain a mixture, and the mixture was put into NMP as a solvent. Thus, negative electrode slurry was obtained.

This negative electrode slurry was applied to an Al foil having a thickness of 20 μm and dried. By pressing the dried coated film, a negative electrode including a negative electrode layer having a density (not including a current collector) of 2.0 g/cm$^3$ was obtained.

(Preparation of Nonaqueous Electrolyte)

Lithium hexafluorophosphate (LiPF$_6$) was dissolved at a concentration of 1.0 mol/L in a mixed solvent prepared by mixing propylene carbonate (PC) and diethyl carbonate (DEC) as nonaqueous solvents at a volume ratio of 1:2, to prepare a nonaqueous electrolyte.

(Assembly of Second Nonaqueous Electrolyte Battery)

A polyethylene separator having a thickness of 20 μm was provided as a separator. The negative electrode produced above, the separator, and the positive electrode produced above, and another separator were stacked in this order to obtain a stack. The stack thus obtained was wound with the negative electrode disposed on the outside until the battery capacity reached 3.05 Ah and pressed into a flat shape. Thus, an electrode group was obtained. A positive electrode terminal was connected to the positive electrode of this electrode group, and a negative electrode terminal was connected to the negative electrode.

This electrode group was housed in a container of a metal can. Also, the nonaqueous electrolyte prepared above was poured into the container and sealed. Thus, a second nonaqueous electrolyte battery having a capacity of 3.05 Ah was obtained.

The second nonaqueous electrolyte battery thus obtained was used as a second battery unit.

[Assembly of Battery Module]

Next, the first battery unit was charged at 0.4 Ah. On the other hand, the second battery unit was charged at 0.05 Ah.

The first battery unit and the second battery unit in these states were electrically connected in series to each other. Thus, the battery module of Example 1 was obtained.

(Measurement of Capacity)

The capacity Cm [Ah] of the battery module of Example 1 was measured according to the procedure described above. The capacity Cm of the battery module of Example 1 was 3 Ah.

(Measurement of Capacity Ratio)

The discharge capacity C1 [Ah] of the first battery unit and the discharge capacity C2 [Ah] of the second battery unit of the battery module of Example 1 were measured by the method described above. The discharge capacity C1 of the first battery unit was 3.3 Ah. The discharge capacity C2 of the second battery unit was 3.05 Ah. By subtracting the capacity Cm (3 Ah) of the battery module from these capacities, it was found that the discharge capacity Ca of the first battery unit is 0.3 Ah and the discharge capacity Cb of the second battery unit is 0.05 Ah. Therefore, the discharge capacity ratio Ca/Cb of Example 1 was 6.

(Measurement of Open Circuit Voltage of Second Battery Unit)

The state-of-charge of the battery module of Example 1 was set to 100% according to the procedure described above. The open circuit voltage OCV of the second battery unit included in the battery module of Example 1 having a state-of-charge of 100% was 2.45 V.

Example 2

In Example 2, a battery module of Example 2 was produced according to the same procedure as that of Example 1 except for the following points.

First, in Example 2, the winding length of a positive electrode layer and the winding length of a negative electrode layer were reduced from those of Example 1 when producing a first nonaqueous electrolyte battery. Thereby, the capacity of the first nonaqueous electrolyte battery prepared in Example 2 was set to 3.1 Ah which was smaller by 0.3 Ah than that of Example 1.

Similarly to Example 1, six of such first nonaqueous electrolyte batteries were produced. Next, the six first nonaqueous electrolyte batteries were electrically connected in series to each other. Thus, a first battery unit was assembled.

The first battery unit thus produced was charged at 0.1 Ah. On the other hand, a second battery unit produced in the same manner as in Example 1 was charged at 0.05 Ah. The first battery unit and the second battery unit in these states were electrically connected in series to each other. Thus, the battery module of Example 2 was obtained.

(Measurement of Capacity)

The capacity Cm [Ah] of the battery module of Example 2 was measured according to the procedure described above. The capacity Cm of the battery module of Example 2 was 3 Ah.

(Measurement of Capacity Ratio)

The discharge capacity C1 [Ah] of the first battery unit and the discharge capacity C2 [Ah] of the second battery unit of the battery module of Example 2 were measured by the method described above. The discharge capacity C1 of the first battery unit was 3.08 Ah. The discharge capacity C2 of the second battery unit was 3.05 Ah. By subtracting the capacity Cm (3 Ah) of the battery module from these capacities, it was found that the discharge capacity Ca of the first battery unit is 0.08 Ah and the discharge capacity Cb of the second battery unit is 0.05 Ah. Therefore, the discharge capacity ratio Ca/Cb of Example 2 was 1.6.

(Measurement of Open Circuit Voltage of Second Battery Unit)

The state-of-charge of the battery module of Example 2 was set to 100% according to the procedure described above. The open circuit voltage OCV of the second battery unit included in the battery module of Example 2 having a state of charge of 100% was 2.45 V.

Example 3

In Example 3, a battery module of Example 3 was produced according to the same procedure as that of Example 1 except for the following points.

First, when producing a first nonaqueous electrolyte battery, the winding length of a positive electrode layer and the winding length of a negative electrode layer were increased from those of Example 1. The capacity of the first nonaqueous electrolyte battery produced in Example 3 was set to 4 Ah which was larger by 0.6 Ah than that of Example 1.

Similarly to Example 1, six of such first nonaqueous electrolyte batteries were produced. Next, the six first nonaqueous electrolyte batteries were electrically connected in series to each other. Thus, a first battery unit was assembled.

The first battery unit thus produced was charged at 1 Ah. On the other hand, a second battery unit produced in the same manner as in Example 1 was charged at 0.05 Ah. The first battery unit and the second battery unit in these states were electrically connected in series to each other. Thus, the battery module of Example 3 was obtained.

(Measurement of Capacity)

The capacity Cm [Ah] of the battery module of Example 3 was measured according to the procedure described above. The capacity Cm of the battery module of Example 3 was 3 Ah.

(Measurement of Capacity Ratio)

The discharge capacity C1 [Ah] of the first battery unit and the discharge capacity C2 [Ah] of the second battery unit of the battery module of Example 3 were measured by the method described above. The discharge capacity C1 of the first battery unit was 4 Ah. The discharge capacity C2 of the second battery unit was 3.05 Ah. By subtracting the capacity Cm (3 Ah) of the battery module from these capacities, it was found that the discharge capacity Ca of the first battery unit is 1 Ah and the discharge capacity Cb of the second battery unit is 0.05 Ah. Therefore, the discharge capacity ratio Ca/Cb of Example 3 was 20.

(Measurement of Open Circuit Voltage of Second Battery Unit)

The state-of-charge of the battery module of Example 3 was set to 100% according to the procedure described above. The open circuit voltage OCV of the second battery unit included in the battery module of Example 3 having a state-of-charge of 100% was 2.45 V.

Example 4

In Example 4, a battery module of Example 4 was produced according to the same procedure as that of Example 3 except for the following points.

First, when producing a second nonaqueous electrolyte battery, the winding length of a positive electrode layer and the winding length of a negative electrode layer were adjusted to produce the second nonaqueous electrolyte battery having a capacity of 3.02 Ah.

A first battery unit produced in the same manner as in Example 3 was charged at 1 Ah. On the other hand, a second battery unit produced as described above was charged at 0.02 Ah. The first battery unit and the second battery unit in these states were electrically connected in series to each other. Thus, the battery module of Example 4 was obtained.

(Measurement of Capacity)

The capacity Cm [Ah] of the battery module of Example 4 was measured according to the procedure described above. The capacity Cm of the battery module of Example 4 was 3 Ah.

(Measurement of Capacity Ratio)

The discharge capacity C1 [Ah] of the first battery unit and the discharge capacity C2 [Ah] of the second battery unit of the battery module of Example 4 were measured by the method described above. The discharge capacity C1 of the first battery unit was 4 Ah. The discharge capacity C2 of the second battery unit was 3.02 Ah. By subtracting the capacity Cm (3 Ah) of the battery module from these capacities, it was found that the discharge capacity Ca of the first battery unit is 1 Ah and the discharge capacity Cb of the second battery unit is 0.02 Ah. Therefore, the discharge capacity ratio Ca/Cb of Example 4 was 50.

(Measurement of Open Circuit Voltage of Second Battery Unit)

The state-of-charge of the battery module of Example 4 was set to 100% according to the procedure described above. The open circuit voltage OCV of the second battery unit included in the battery module of Example 4 having a state-of-charge of 100% was 2.45 V.

Example 5

In Example 5, a battery module of Example 5 was produced according to the same procedure as that of Example 1 except for the following points.

In Example 5, a second nonaqueous electrolyte battery of 3.05 Ah was produced in the same manner as in Example 1 except that a lithium-cobalt-nickel-manganese composite oxide ($LiNi_{0.5}Co_{0.2}Mn_{0.3}O_2$) was used as a positive electrode active material instead of the lithium-cobalt-nickel-manganese composite oxide ($LiNi_{0.33}Co_{0.33}Mn_{0.33}O_2$). This second nonaqueous electrolyte battery was used as a second battery unit.

A first battery unit produced in the same manner as in Example 1 was charged at 0.4 Ah. On the other hand, the second battery unit produced as described above was charged at 0.05 Ah. The first battery unit and the second battery unit in these states were electrically connected in series to each other. Thus, the battery module of Example 5 was obtained.

(Measurement of Capacity)

The capacity Cm [Ah] of the battery module of Example 5 was measured according to the procedure described above. The capacity Cm of the battery module of Example 5 was 3 Ah.

(Measurement of Capacity Ratio)

The discharge capacity C1 [Ah] of the first battery unit and the discharge capacity C2 [Ah] of the second battery unit of the battery module of Example 5 were measured by the method described above. The discharge capacity C1 of the first battery unit was 3.3 Ah. The discharge capacity C2 of the second battery unit was 3.05 Ah. By subtracting the capacity Cm (3 Ah) of the battery module from these capacities, it was found that the discharge capacity Ca of the first battery unit is 0.3 Ah and the discharge capacity Cb of the second battery unit is 0.05 Ah. Therefore, the discharge capacity ratio Ca/Cb of Example 5 was 6.

(Measurement of Open Circuit Voltage of Second Battery Unit)

The state-of-charge of the battery module of Example 5 was set to 100% according to the procedure described above. The open circuit voltage OCV of the second battery unit included in the battery module of Example 5 having a state-of-charge of 100% was 2.45 V.

Example 6

In Example 6, a battery module of Example 6 was produced according to the same procedure as that of Example 1 except for the following points.

In Example 6, a second nonaqueous electrolyte battery of 3.05 Ah was produced in the same manner as in Example 1 except that a lithium-cobalt-nickel-manganese composite oxide ($LiNi_{0.8}Co_{0.1}Mn_{0.1}O_2$) was used as a positive electrode active material instead of a lithium cobalt nickel manganese composite oxide ($LiNi_{0.33}Co_{0.33}Mn_{0.33}O_2$). This second nonaqueous electrolyte battery was used as a second battery unit.

A first battery unit produced in the same manner as in Example 1 was charged at 0.4 Ah. On the other hand, the second battery unit produced as described above was charged at 0.05 Ah. The first battery unit and the second battery unit in these states were electrically connected in series to each other. Thus, the battery module of Example 6 was obtained.

(Measurement of Capacity)

The capacity Cm [Ah] of the battery module of Example 6 was measured according to the procedure described above. The capacity Cm of the battery module of Example 6 was 3 Ah.

(Measurement of Capacity Ratio)

The discharge capacity C1 [Ah] of the first battery unit and the discharge capacity C2 [Ah] of the second battery unit of the battery module of Example 6 were measured by the method described above. The discharge capacity C1 of the first battery unit was 3.3 Ah. The discharge capacity C2 of the second battery unit was 3.05 Ah. By subtracting the capacity Cm (3 Ah) of the battery module from these capacities, it was found that the discharge capacity Ca of the first battery unit is 0.3 Ah and the discharge capacity Cb of the second battery unit is 0.05 Ah. Therefore, the discharge capacity ratio Ca/Cb of Example 6 was 6.

(Measurement of Open Circuit Voltage of Second Battery Unit)

The state-of-charge of the battery module of Example 6 was set to 100% according to the procedure described above. The open circuit voltage OCV of the second battery unit included in the battery module of Example 6 having a state-of-charge of 100% was 2.45 V.

Example 7

In Example 7, a battery module of Example 7 was produced according to the same procedure as that of Example 1 except for the following points.

In Example 7, a second nonaqueous electrolyte battery of 3.05 Ah was produced in the same manner as in Example 1 except that a lithium-cobalt-composite oxide ($LiCoO_2$) was used as a positive electrode active material instead of the lithium-cobalt-nickel-manganese composite oxide ($LiNi_{0.33}Co_{0.33}Mn_{0.33}O_2$). This second nonaqueous electrolyte battery was used as a second battery unit.

A first battery unit produced in the same manner as in Example 1 was charged at 0.4 Ah. On the other hand, the second battery unit produced as described above was charged at 0.05 Ah. The first battery unit and the second battery unit in these states were electrically connected in series to each other. Thus, the battery module of Example 7 was obtained.

(Measurement of Capacity)

The capacity Cm [Ah] of the battery module of Example 7 was measured according to the procedure described above. The capacity Cm of the battery module of Example 7 was 3 Ah.

(Measurement of Capacity Ratio)

The discharge capacity C1 [Ah] of the first battery unit and the discharge capacity C2 [Ah] of the second battery unit of the battery module of Example 7 were measured by the method described above. The discharge capacity C1 of the first battery unit was 3.3 Ah. The discharge capacity C2 of the second battery unit was 3.05 Ah. By subtracting the capacity Cm (3 Ah) of the battery module from these capacities, it was found that the discharge capacity Ca of the first battery unit is 0.3 Ah and the discharge capacity Cb of the second battery unit is 0.05 Ah. Therefore, the discharge capacity ratio Ca/Cb of Example 7 was 6.

(Measurement of Open Circuit Voltage of Second Battery Unit)

The state-of-charge of the battery module of Example 7 was set to 100% according to the procedure described above. The open circuit voltage OCV of the second battery unit included in the battery module of Example 7 having a state-of-charge of 100% was 2.45 V.

Example 8

In Example 8, a battery module of Example 8 was produced according to the same procedure as that of Example 1 except for the following points.

In Example 8, a second nonaqueous electrolyte battery of 3.05 Ah was produced in the same manner as in Example 1 except that a mixture obtained by mixing a lithium-cobalt-nickel-manganese composite oxide ($LiNi_{0.33}Co_{0.33}Mn_{0.33}O_2$) and a lithium-cobalt composite oxide ($LiCoO_2$) at a weight ratio of 70:30 was used as a positive electrode active material instead of the lithium-cobalt-nickel-manganese composite oxide ($LiNi_{0.33}Co_{0.33}Mn_{0.33}O_2$). This second nonaqueous electrolyte battery was used as a second battery unit.

A first battery unit produced in the same manner as in Example 1 was charged at 0.4 Ah. On the other hand, the second battery unit produced as described above was charged at 0.05 Ah. The first battery unit and the second battery unit in these states were electrically connected in series to each other. Thus, the battery module of Example 8 was obtained.

(Measurement of Capacity)

The capacity Cm [Ah] of the battery module of Example 8 was measured according to the procedure described above. The capacity Cm of the battery module of Example 8 was 3 Ah.

(Measurement of Capacity Ratio)

The discharge capacity C1 [Ah] of the first battery unit and the discharge capacity C2 [Ah] of the second battery unit of the battery module of Example 8 were measured by the method described above. The discharge capacity C1 of the first battery unit was 3.3 Ah. The discharge capacity C2 of the second battery unit was 3.05 Ah. By subtracting the capacity Cm (3 Ah) of the battery module from these capacities, it was found that the discharge capacity Ca of the first battery unit is 0.3 Ah and the discharge capacity Cb of the second battery unit is 0.05 Ah. Therefore, the discharge capacity ratio Ca/Cb of Example 8 was 6.

(Measurement of Open Circuit Voltage of Second Battery Unit)

The state-of-charge of the battery module of Example 8 was set to 100% according to the procedure described above. The open circuit voltage (OCV) of the second battery unit included in the battery module of Example 8 having a state-of-charge of 100% was 2.45 V.

Example 9

In Example 9, a battery module of Example 9 was produced according to the same procedure as that of Example 1 except for the following points.

First, in Example 9, a first nonaqueous electrolyte battery of 3.4 Ah was produced in the same manner as in Example 1 except that an olivine-type lithium phosphate represented by the chemical formula of $LiMn_{0.85}Fe_{0.1}Mg_{0.05}PO_4$ was used as a positive electrode active material instead of the olivine-type lithium iron phosphate ($LiFePO_4$).

By repeating the same procedure, a total of five first nonaqueous electrolyte batteries were produced. Next, the five first nonaqueous electrolyte batteries were electrically connected in series to each other. Thus, a first battery unit was assembled.

The first battery unit thus produced was charged at 0.4 Ah. On the other hand, a second battery unit produced in the same manner as in Example 1 was charged at 0.05 Ah. The first battery unit and the second battery unit in these states were electrically connected in series to each other. Thus, the battery module of Example 9 was obtained.

(Measurement of Capacity) The capacity Cm [Ah] of the battery module of Example 9 was measured according to the procedure described above. The capacity Cm of the battery module of Example 9 was 3 Ah.

(Measurement of Capacity Ratio)

The discharge capacity C1 [Ah] of the first battery unit and the discharge capacity C2 [Ah] of the second battery unit of the battery module of Example 9 were measured by the method described above. The discharge capacity C1 of the first battery unit was 3.3 Ah. The discharge capacity C2 of the second battery unit was 3.05 Ah. By subtracting the capacity Cm (3 Ah) of the battery module from these capacities, it was found that the discharge capacity Ca of the first battery unit is 0.3 Ah and the discharge capacity Cb of the second battery unit is 0.05 Ah. Therefore, the discharge capacity ratio Ca/Cb of Example 9 was 6.

(Measurement of Open Circuit Voltage of Second Battery Unit)

The state-of-charge of the battery module of Example 9 was set to 100% according to the procedure described above. The open circuit voltage (OCV) of the second battery unit included in the battery module of Example 9 having a state-of-charge of 100% was 2.45 V.

Example 10

In Example 10, a battery module of Example 10 was produced according to the same procedure as that of Example 1 except for the following points.

In Example 10, a second nonaqueous electrolyte battery was produced in the same manner as in Example 1 except that a mixture obtained by mixing a spinel-type lithium-titanium composite oxide and a monoclinic β type titanium composite oxide ($TiO_2$ (B)) at a weight ratio of 50:50 was used as a negative electrode active material instead of the spinel-type lithium-titanium composite oxide ($Li_4Ti_5O_{12}$). The second nonaqueous electrolyte battery thus produced had a capacity of 3.05 Ah.

A first battery unit produced in the same manner as in Example 1 was charged at 0.4 Ah. On the other hand, the second battery unit produced as described above was charged at 0.05 Ah. The first battery unit and the second battery unit in these states were electrically connected in series to each other. Thus, the battery module of Example 10 was obtained.

(Measurement of Capacity)

The capacity Cm [Ah] of the battery module of Example 10 was measured according to the procedure described above. The capacity Cm of the battery module of Example 10 was 3 Ah.

(Measurement of Capacity Ratio)

The discharge capacity C1 [Ah] of the first battery unit and the discharge capacity C2 [Ah] of the second battery unit of the battery module of Example 10 were measured by the method described above. The discharge capacity C1 of the first battery unit was 3.3 Ah. The discharge capacity C2 of the second battery unit was 3.05 Ah. By subtracting the capacity Cm (3 Ah) of the battery module from these capacities, it was found that the discharge capacity Ca of the first battery unit is 0.3 Ah and the discharge capacity Cb of the second battery unit is 0.05 Ah. Therefore, the discharge capacity ratio Ca/Cb of Example 10 was 6.

(Measurement of Open Circuit Voltage of Second Battery Unit)

The state-of-charge of the battery module of Example 10 was set to 100% according to the procedure described above. The open circuit voltage OCV of the second battery unit included in the battery module of Example 10 having a state-of-charge of 100% was 2.5 V.

Example 11

In Example 11, a battery module of Example 11 was produced according to the same procedure as that of Example 1 except for the following points.

In Example 11, a second nonaqueous electrolyte battery of 3.05 Ah was produced in the same manner as in Example 1 except that a mixture obtained by mixing a spinel-type lithium-titanium composite oxide and a monoclinic 3-type titanium composite oxide $TiO_2$ (B) at a weight ratio of 80:20 was used as a negative electrode active material instead of the spinel-type lithium-titanium composite oxide ($Li_4Ti_5O_{12}$).

A first battery unit produced in the same manner as in Example 1 was charged at 0.4 Ah. On the other hand, the second battery unit produced as described above was charged at 0.05 Ah. The first battery unit and the second battery unit in these states were electrically connected in series to each other. Thus, the battery module of Example 11 was obtained.

(Measurement of Capacity)

The capacity Cm [Ah] of the battery module of Example 11 was measured according to the procedure described above. The capacity Cm of the battery module of Example 11 was 3 Ah.

(Measurement of Capacity Ratio)

The discharge capacity C1 [Ah] of the first battery unit and the discharge capacity C2 [Ah] of the second battery unit of the battery module of Example 11 were measured by the method described above. The discharge capacity C1 of the first battery unit was 3.3 Ah. The discharge capacity C2 of the second battery unit was 3.05 Ah. By subtracting the capacity Cm (3 Ah) of the battery module from these capacities, it was found that the discharge capacity Ca of the first battery unit is 0.3 Ah and the discharge capacity Cb of the second battery unit is 0.05 Ah. Therefore, the discharge capacity ratio Ca/Cb of Example 11 was 6.

(Measurement of Open Circuit Voltage of Second Battery Unit)

The state-of-charge of the battery module of Example 11 was set to 100% according to the procedure described above. The open circuit voltage (OCV) of the second battery unit included in the battery module of Example 11 having a state-of-charge of 100% was 2.5 V.

Example 12

In Example 12, a battery module of Example 12 was produced according to the same procedure as that of Example 1 except for the following points.

In Example 12, a second nonaqueous electrolyte battery of 3.05 Ah was produced in the same manner as in Example 1 except that a mixture obtained by mixing a spinel-type lithium-titanium composite oxide and a niobium-titanium composite oxide ($TiNb_2O_7$) at a weight ratio of 50:50 was used as a negative electrode active material instead of the spinel-type lithium-titanium composite oxide ($Li_4Ti_5O_{12}$).

A first battery unit produced in the same manner as in Example 1 was charged at 0.4 Ah. On the other hand, the second battery unit produced as described above was charged at 0.05 Ah. The first battery unit and the second battery unit in these states were electrically connected in series to each other. Thus, the battery module of Example 12 was obtained.

(Measurement of Capacity)

The capacity Cm [Ah] of the battery module of Example 12 was measured according to the procedure described above. The capacity Cm of the battery module of Example 12 was 3 Ah.

(Measurement of Capacity Ratio)

The discharge capacity C1 [Ah] of the first battery unit and the discharge capacity C2 [Ah] of the second battery unit of the battery module of Example 12 were measured by the method described above. The discharge capacity C1 of the first battery unit was 3.3 Ah. The discharge capacity C2 of the second battery unit was 3.05 Ah. By subtracting the capacity Cm (3 Ah) of the battery module from these capacities, it was found that the discharge capacity Ca of the first battery unit is 0.3 Ah and the discharge capacity Cb of the second battery unit is 0.05 Ah. Therefore, the discharge capacity ratio Ca/Cb of Example 12 was 6.

(Measurement of Open Circuit Voltage of Second Battery Unit)

The state-of-charge of the battery module of Example 12 was set to 100% according to the procedure described above. The open circuit voltage (OCV) of the second battery unit included in the battery module of Example 12 having a state-of-charge of 100% was 2.6 V.

Example 13

In Example 13, a battery module of Example 13 was produced according to the same procedure as that of Example 10 except for the following points.

First, according to the following procedure, an orthorhombic Na-containing niobium-titanium composite oxide ($Li_2Na_{1.8}Ti_{5.8}Nb_{0.2}O_{14}$) was synthesized.

First, titanium oxide $TiO_2$, lithium carbonate $Li_2CO_3$, sodium carbonate $Na_2CO_3$, and niobium (V) hydroxide $Nb(V)(OH)_5$ were provided as starting materials. Second, these starting materials were mixed in such a manner that the molar ratio of Li:Na:Ti:Nb in the mixture was set to 2:1.8:5.8:0.2. The mixture thus obtained was heat treated at 900° C. for 3 hours in an atmospheric atmosphere. This gave a product powder.

The product powder was analyzed using the combination of XRD and ICP as described above. These results showed that the obtained product powder was the orthorhombic Na-containing niobium titanium-composite oxide represented by $Li_2Na_{1.8}Ti_{5.8}Nb_{0.2}O_{14}$.

Next, the orthorhombic Na-containing niobium-titanium composite oxide and a spinel-type lithium-titanium composite oxide ($Li_4Ti_5O_{12}$) were mixed at a weight ratio of 50:50 to obtain a mixture.

Next, a second nonaqueous electrolyte battery of 3.05 Ah was produced in the same manner as in Example 1 except that this mixture was used as a negative electrode active material instead of the spinel-type lithium-titanium composite oxide, and the coating amount was increased by 15%.

A first battery unit produced in the same manner as in Example 1 was charged at 0.4 Ah. On the other hand, the second battery unit produced as described above was charged at 0.05 Ah. The first battery unit and the second battery unit in these states were electrically connected in series to each other. Thus, the battery module of Example 13 was obtained.

(Measurement of Capacity)

The capacity Cm [Ah] of the battery module of Example 13 was measured according to the procedure described above. The capacity Cm of the battery module of Example 13 was 3 Ah.

(Measurement of Capacity Ratio)

The discharge capacity C1 [Ah] of the first battery unit and the discharge capacity C2 [Ah] of the second battery unit of the battery module of Example 13 were measured by the method described above. The discharge capacity C1 of the first battery unit was 3.3 Ah. The discharge capacity C2 of the second battery unit was 0.05 Ah. By subtracting the capacity Cm (3 Ah) of the battery module from these capacities, it was found that the discharge capacity Ca of the first battery unit is 0.3 Ah and the discharge capacity Cb of the second battery unit is 0.05 Ah. Therefore, the discharge capacity ratio Ca/Cb of Example 13 was 6.

(Measurement of Open Circuit Voltage of Second Battery Unit)

The state-of-charge of the battery module of Example 13 was set to 100% according to the procedure described above. The open circuit voltage (OCV) of the second battery unit included in the battery module of Example 13 having a state-of-charge of 100% was 3.0 V.

Example 14

In Example 14, a battery module of Example 14 was produced according to the same procedure as that of Example 1 except for the following points.

In Example 14, a second nonaqueous electrolyte battery of 3.05 Ah was produced in the same manner as in Example 1 except that the amount of a positive electrode with respect to a negative electrode of a second nonaqueous electrolyte battery was adjusted so as to increase the utilization ratio of the positive electrode and in turn so that the open circuit voltage OCV of a second battery unit included in the battery module having a state of charge of 100% was set to 2.55 V.

(Measurement of Capacity)

The capacity Cm [Ah] of the battery module of Example 14 was measured according to the procedure described above. The capacity Cm of the battery module of Example 14 was 3 Ah.

(Measurement of Capacity Ratio)

The discharge capacity C1 [Ah] of the first battery unit and the discharge capacity C2 [Ah] of the second battery unit of the battery module of Example 14 were measured by the method described above. The discharge capacity C1 of the first battery unit was 3.3 Ah. The discharge capacity C2 of the second battery unit was 3.05 Ah. By subtracting the capacity Cm (3 Ah) of the battery module from these capacities, it was found that the discharge capacity Ca of the first battery unit is 0.3 Ah and the discharge capacity Cb of the second battery unit is 0.05 Ah. Therefore, the discharge capacity ratio Ca/Cb of Example 14 was 6.

(Measurement of Open Circuit Voltage of Second Battery Unit)

The state-of-charge of the battery module of Example 14 was set to 100% according to the procedure described above. The open circuit voltage OCV of the second battery unit included in the battery module of Example 14 having a state-of-charge of 100% was 2.55 V.

Comparative Example 1

In Comparative Example 1, a battery module of Comparative Example 1 was produced according to the same procedure as that of Example 1 except for the following points.

In Comparative Example 1, the winding length of a positive electrode layer and the winding length of a negative electrode layer were reduced from those of Example 1 when producing a first nonaqueous electrolyte battery. Thereby, the capacity of the first nonaqueous electrolyte battery produced in Comparative Example 1 was set to 3.02 Ah which was smaller by 0.38 Ah than that of Example 1.

Furthermore, in Comparative Example 1, the winding length of a positive electrode layer and the winding length of a negative electrode layer were increased from those of Example 1 when producing a second nonaqueous electrolyte battery. Thereby, the capacity of the second nonaqueous electrolyte battery produced in Comparative Example 1 was set to 3.1 Ah which was larger by 0.05 Ah than that of Example 1.

Furthermore, in Comparative Example 1, a first battery unit was charged at 0.02 Ah before the first battery unit and a second battery unit were connected to each other. On the other hand, the second battery unit was charged at 0.1 Ah.

(Measurement of Capacity)

The capacity Cm [Ah] of the battery module of Comparative Example 1 was measured according to the procedure described above. The capacity Cm of the battery module of Comparative Example 1 was 3 Ah.

(Measurement of Capacity Ratio)

The discharge capacity C1 [Ah] of the first battery unit and the discharge capacity C2 [Ah] of the second battery unit of the battery module of Comparative Example 1 were measured by the method described above. The discharge capacity C1 of the first battery unit was 3.01 Ah. The discharge capacity C2 of the second battery unit was 3.1 Ah. By subtracting the capacity Cm (3 Ah) of the battery module from these capacities, it was found that the discharge capacity Ca of the first battery unit is 0.01 Ah and the discharge capacity Cb of the second battery unit is 0.1 Ah. Therefore, the discharge capacity ratio Ca/Cb of Comparative Example 1 was 0.1.

(Measurement of Open Circuit Voltage of Second Battery Unit)

The state-of-charge of the battery module of Comparative Example 1 was set to 100% according to the above-described procedure. The open circuit voltage (OCV) of the second battery unit included in the battery module of Comparative Example 1 having a state-of-charge of 100% was 2.45 V.

Comparative Example 2

In Comparative Example 2, a battery module of Comparative Example 2 was produced in the same procedure as in that of Example 1 except for the following points.

In Comparative Example 2, the winding length of a positive electrode layer and the winding length of a negative electrode layer were reduced from those of Example 1 when producing a first nonaqueous electrolyte battery. Thereby, the capacity of the first nonaqueous electrolyte battery produced in Comparative Example 2 was set to 3.08 Ah which was smaller by 0.32 Ah than that of Example 1.

In Comparative Example 2, the winding length of a positive electrode layer and the winding length of a negative electrode layer were reduced from those of Example 1 when producing a second nonaqueous electrolyte battery. Thereby, the capacity of the second nonaqueous electrolyte battery produced in Comparative Example 2 was 3.02 Ah which was 0.03 Ah smaller than that of Example 1.

In Comparative Example 2, a first battery unit was charged at 0.08 Ah before the first battery unit and a second battery unit were connected to each other. On the other hand, the second battery unit was charged at 0.05 Ah.

(Measurement of Capacity)

The capacity Cm [Ah] of the battery module of Comparative Example 2 was measured according to the procedure described above. The capacity Cm of the battery module of Comparative Example 2 was 3 Ah.

(Measurement of Capacity Ratio)

The discharge capacity C1 [Ah] of the first battery unit and the discharge capacity C2 [Ah] of the second battery unit of the battery module of Comparative Example 2 were measured by the method described above. The discharge capacity C1 of the first battery unit was 3.06 Ah. The discharge capacity C2 of the second battery unit was 3.05 Ah. By subtracting the capacity Cm (3 Ah) of the battery module from these capacities, it was found that the discharge capacity Ca of the first battery unit is 0.06 Ah and the discharge capacity Cb of the second battery unit is 0.05 Ah. Therefore, the discharge capacity ratio Ca/Cb of Comparative Example 2 was 1.2.

(Measurement of Open Circuit Voltage of Second Battery Unit)

The state-of-charge of the battery module of Comparative Example 2 was set to 100% according to the procedure described above. The open circuit voltage (OCV) of the second battery unit included in the battery module of Comparative Example 2 having a state-of-charge of 100% was 2.45 V.

Comparative Example 3

In Comparative Example 3, a battery module of Comparative Example 3 was produced according to the same procedure as that of Example 1 except for the following points.

In Comparative Example 3, the winding length of a positive electrode layer and the winding length of a negative electrode layer were increased from those of Example 1 when producing a first nonaqueous electrolyte battery. Thereby, the capacity of the first nonaqueous electrolyte battery produced in Comparative Example 3 was set to 4.5 Ah which was larger by 1.1 Ah than that of Example 1.

Furthermore, in Comparative Example 3, the winding length of a positive electrode layer and the winding length of a negative electrode layer were reduced from those of Example 1 when producing a second nonaqueous electrolyte battery. Thereby, the capacity of the second nonaqueous electrolyte battery produced in Comparative Example 3 was set to 3.02 Ah which was smaller by 0.03 Ah than that of Example 1.

Furthermore, in Comparative Example 3, a first battery unit was charged at 1.5 Ah before the first battery unit and a second battery unit were connected to each other. On the other hand, the second battery unit was charged at 0.02 Ah.

(Measurement of Capacity)

The capacity Cm [Ah] of the battery module of Comparative Example 3 was measured according to the procedure described above. The capacity Cm of the battery module of Comparative Example 3 was 3 Ah.

(Measurement of Capacity Ratio)

The discharge capacity C1 [Ah] of the first battery unit and the discharge capacity C2 [Ah] of the second battery unit of the battery module of Comparative Example 3 were measured by the method described above. The discharge capacity C1 of the first battery unit was 4.2 Ah. The discharge capacity C2 of the second battery unit was 3.02 Ah. By subtracting the capacity Cm (3 Ah) of the battery module from these capacities, it was found that the discharge capacity Ca of the first battery unit is 1.2 Ah and the discharge capacity Cb of the second battery unit is 0.02 Ah. Therefore, the discharge capacity ratio Ca/Cb of Comparative Example 3 was 60.

(Measurement of Open Circuit Voltage of Second Battery Unit)

The state-of-charge of the battery module of Comparative Example 3 was set to 100% according to the above-described procedure. The open circuit voltage (OCV) of the second battery unit included in the battery module of Comparative Example 3 having a state-of-charge of 100% was 2.45 V.

Comparative Example 4

In Comparative Example 4, a battery module of Comparative Example 4 was produced according to the same procedure as that of Example 1 except for the following points.

First, in Comparative Example 4, graphite was used as a negative electrode active material of a first nonaqueous electrolyte battery instead of the spinel-type lithium-titanium composite oxide. This graphite and polyvinylidene fluoride (PVdF) were mixed at a weight ratio of 95:5 to obtain a mixture, and the mixture was put into N-methylpyrrolidone as a solvent. Thus, negative electrode slurry was obtained. This slurry was applied to a Cu foil having a thickness of 20 μm and dried. By pressing the dried coating film, a negative electrode including a negative electrode layer having a density (not including a current collector) of 1.3 g/cm$^3$ was obtained.

As a nonaqueous electrolyte, a product prepared by dissolving lithium hexafluorophosphate (LiPF$_6$) at a concentration of 1.0 mol/L in a mixed solvent in which ethylene carbonate (EC) and ethyl methyl carbonate (MEC) were mixed at a volume ratio of 1:2 was used.

A first nonaqueous electrolyte battery having a capacity of 3.5 Ah was produced according to the same procedure as that of Example 1 except that the negative electrode and nonaqueous electrolyte produced as described above were used.

By repeating the same procedure, a total of four first nonaqueous electrolyte batteries were produced. Next, the four first nonaqueous electrolyte batteries were electrically connected in series to each other. Thus, a first battery unit was assembled.

The first battery unit thus produced was charged at 0.5 Ah. On the other hand, a second battery unit produced in the same manner as in Example 1 was charged at 0.05 Ah. The first battery unit and the second battery unit in these states were electrically connected in series to each other. Thus, the battery module of Comparative Example 4 was obtained.

(Measurement of Capacity)

The capacity Cm [Ah] of the battery module of Comparative Example 4 was measured according to the procedure described above. The capacity Cm of the battery module of Comparative Example 4 was 3 Ah.

(Measurement of Capacity Ratio)

The discharge capacity C1 [Ah] of the first battery unit and the discharge capacity C2 [Ah] of the second battery unit of the battery module of Comparative Example 4 were measured by the method described above. The discharge capacity C1 of the first battery unit was 3.2 Ah. The discharge capacity C2 of the second battery unit was 0.05 Ah. By subtracting the capacity Cm (3 Ah) of the battery module from these capacities, it was found that the discharge capacity Ca of the first battery unit is 0.2 Ah and the discharge capacity Cb of the second battery unit is 0.05 Ah. Therefore, the discharge capacity ratio Ca/Cb of Comparative Example 4 was 4.

(Measurement of Open Circuit Voltage of Second Battery Unit)

The state-of-charge of the battery module of Comparative Example 4 was set to 100% according to the procedure described above. The open circuit voltage (OCV) of the second battery unit included in the battery module of Comparative Example 4 having a state-of-charge of 100% was 2.45 V.

Comparative Example 5

In Comparative Example 5, a battery module of Comparative Example 5 was produced according to the following procedure.

First, in Comparative Example 5, seven first nonaqueous electrolyte batteries were produced according to the same procedure as that of Example 1. Next, the seven first nonaqueous electrolyte batteries were electrically connected in series to each other. Thus, a first battery unit was assembled.

The first battery unit thus obtained was used as the battery module of Comparative Example 5. The capacity Cm of the battery module of Comparative Example 5 was 3 Ah.

Comparative Example 6

In Comparative Example 6, a battery module of Comparative Example 6 was produced according to the following procedure.

First, an olivine-type lithium-iron phosphate ($LiFePO_4$) and a lithium-cobalt-nickel-manganese composite oxide ($LiNi_{0.33}Co_{0.33}Mn_{0.33}O_2$) were provided. These were mixed at a weight ratio of $LiFePO_4:LiNi_{0.33}Co_{0.33}Mn_{0.33}O_2=6:1$ to obtain a mixture.

A nonaqueous electrolyte battery of Comparative Example 6 was obtained according to the same procedure as that for manufacturing the first nonaqueous electrolyte battery produced in Example 1 except that the mixture thus obtained was used as a positive electrode active material. By repeating the same procedure, six nonaqueous electrolyte batteries of Comparative Example 6 were obtained.

These six nonaqueous electrolyte batteries were connected in series to obtain the battery module of Comparative Example 6. The capacity of the battery module of Comparative Example 6 was 3 Ah.

Comparative Example 7

In Comparative Example 7, a battery module of Comparative Example 7 was produced according to the following procedure.

First, in Comparative Example 7, six second nonaqueous electrolyte batteries were produced, each according to the same procedure as that of Example 1. Next, the six second nonaqueous electrolyte batteries were electrically connected in series to each other. Thus, a second battery unit was assembled. The capacity of the second battery unit was 3 Ah.

The second battery unit thus obtained was used as the battery module of Comparative Example 7.

(Charge-and-Discharge Cycle Test)

The battery module of Example 1 was subjected to a charge-and-discharge cycle test in a temperature environment of 60° C. In the charge-and-discharge cycle test, a current value was set to 5 C and a charge-and-discharge voltage range was set to 12.5 V to 15 V. In the battery module of Example 1, a capacity retention ratio after 500 cycles was 90%.

The same charge-and-discharge cycle test was also carried out for each of the battery modules of Examples 2 to 14 and Comparative Examples 1 to 7.

The following Table 1 shows the active materials of the first and second nonaqueous electrolyte batteries for Examples 1 to 14 and Comparative Examples 1 to 7. The following Table 2 shows the capacity ratio Ca/Cb, the open circuit voltage of the second nonaqueous electrolyte battery included in each battery module having a state-of-charge of 100%, and the capacity retention ratio after 500 cycles in the charge-and-discharge cycle test for each of Examples 1 to 14 and Comparative Examples 1 to 7.

TABLE 1

| | First Nonaqueous Electrolyte Battery | | Second Nonaqueous Electrolyte Battery | |
|---|---|---|---|---|
| | Positive Electrode | Negative Electrode | Positive Electrode | Negative Electrode |
| Example 1 | $LiFePO_4$ | LTO | $LiNi_{0.33}Co_{0.33}Mn_{0.33}O_2$ | LTO |
| Example 2 | $LiFePO_4$ | LTO | $LiNi_{0.33}Co_{0.33}Mn_{0.33}O_2$ | LTO |
| Example 3 | $LiFePO_4$ | LTO | $LiNi_{0.33}Co_{0.33}Mn_{0.33}O_2$ | LTO |
| Example 4 | $LiFePO_4$ | LTO | $LiNi_{0.33}Co_{0.33}Mn_{0.33}O_2$ | LTO |
| Example 5 | $LiFePO_4$ | LTO | $LiNi_{0.5}Co_{0.2}Mn_{0.3}O_2$ | LTO |
| Example 6 | $LiFePO_4$ | LTO | $LiNi_{0.8}Co_{0.1}Mn_{0.1}O_2$ | LTO |
| Example 7 | $LiFePO_4$ | LTO | $LiCoO_2$ | LTO |
| Example 8 | $LiFePO_4$ | LTO | $LiNi_{0.33}Co_{0.33}Mn_{0.33}O_2$ (70) + $LiCoO_2$ (30) | LTO |
| Example 9 | $LiMn_{0.85}Fe_{0.1}Mg_{0.05}PO_4$ | LTO | $LiNi_{0.33}Co_{0.33}Mn_{0.33}O_2$ | LTO |
| Example 10 | $LiFePO_4$ | LTO | $LiNi_{0.33}Co_{0.33}Mn_{0.33}O_2$ | LTO (50) + $TiO_2(B)$ (50) |
| Example 11 | $LiFePO_4$ | LTO | $LiNi_{0.33}Co_{0.33}Mn_{0.33}O_2$ | LTO (80) + $TiO_2(B)$ (20) |
| Example 12 | $LiFePO_4$ | LTO | $LiNi_{0.33}Co_{0.33}Mn_{0.33}O_2$ | LTO (50) + NTO (50) |
| Example 13 | $LiFePO_4$ | LTO | $LiNi_{0.33}Co_{0.33}Mn_{0.33}O_2$ | LTO (50) + LNTO (50) |
| Example 14 | $LiFePO_4$ | LTO | $LiNi_{0.33}Co_{0.33}Mn_{0.33}O_2$ | LTO |
| Comparative Example 1 | $LiFePO_4$ | LTO | $LiNi_{0.33}Co_{0.33}Mn_{0.33}O_2$ | LTO |
| Comparative Example 2 | $LiFePO_4$ | LTO | $LiNi_{0.33}Co_{0.33}Mn_{0.33}O_2$ | LTO |
| Comparative Example 3 | $LiFePO_4$ | LTO | $LiNi_{0.33}Co_{0.33}Mn_{0.33}O_2$ | LTO |
| Comparative Example 4 | $LiFePO_4$ | graphite | $LiNi_{0.33}Co_{0.33}Mn_{0.33}O_2$ | LTO |
| Comparative Example 5 | $LiFePO_4$ | LTO | — | — |

TABLE 1-continued

| | First Nonaqueous Electrolyte Battery | | Second Nonaqueous Electrolyte Battery | |
|---|---|---|---|---|
| | Positive Electrode | Negative Electrode | Positive Electrode | Negative Electrode |
| Comparative Example 6 | LiFePO$_4$ + LiN$_{0.33}$Co$_{0.33}$Mn$_{0.33}$O$_2$ (6:1) | LTO | — | — |
| Comparative Example 7 | — | — | LiNi$_{0.33}$Co$_{0.33}$Mn$_{0.33}$O$_2$ | LTO |

TABLE 2

| | Discharge Capacity Ratio Ca/Cb | Open Circuit Voltage (V) of Second Battery Unit included in Battery Module having state-of-charge of 100% | Capacity Retention Ratio (%) after 500 cycles under 60° C. |
|---|---|---|---|
| Example 1 | 6 | 2.45 | 90 |
| Example 2 | 1.6 | 2.45 | 86 |
| Example 3 | 20 | 2.45 | 92 |
| Example 4 | 50 | 2.45 | 93 |
| Example 5 | 6 | 2.45 | 90 |
| Example 6 | 6 | 2.45 | 87 |
| Example 7 | 6 | 2.45 | 85 |
| Example 8 | 6 | 2.45 | 86 |
| Example 9 | 6 | 2.45 | 83 |
| Example 10 | 6 | 2.5 | 88 |
| Example 11 | 6 | 2.5 | 89 |
| Example 12 | 6 | 2.6 | 87 |
| Example 13 | 6 | 3.0 | 85 |
| Example 14 | 6 | 2.55 | 81 |
| Comparative Example 1 | 0.1 | 2.45 | 76 |
| Comparative Example 2 | 1.2 | 2.45 | 79 |
| Comparative Example 3 | 60 | 2.45 | 78 |
| Comparative Example 4 | 4 | 2.45 | 69 |
| Comparative Example 5 | — | — | 72 |
| Comparative Example 6 | — | — | 70 |
| Comparative Example 7 | — | 2.45 | 70 |

As is apparent from the results shown in Table 2, the capacity retention ratio in the cycle test of each of the battery modules of Examples 1 to 14 was more excellent than those of the battery modules of Comparative Examples 1 to 7.

On the other hand, in each of the battery modules of Comparative Examples 1 and 2 in each of which the capacity ratio Ca/Cb was smaller than 1.5, the capacity retention ratio in the cycle test was low. It is considered that, when each of the battery modules of Comparative Examples 1 and 2 was discharged at the current value of 5 C to sharply lower the state of charge, the resistance of the first nonaqueous electrolyte battery included in the first battery unit sharply increased. Therefore, it is considered that the voltage of the first nonaqueous electrolyte battery in each of the battery modules of Comparative Examples 1 and 2 sharply decreased, as a result of which the deterioration of the first nonaqueous electrolyte battery was promoted.

On the other hand, also in Comparative Example 3 in which the capacity ratio Ca/Cb was larger than 50, the capacity retention ratio in the cycle test was low. It is presumed that, since the difference in capacity between the first battery unit and the second battery unit in the battery module of Comparative Example 3 was large, the difference in resistance value between the first unit and the second cell unit was large, and the shift in the state-of-charge between the first and second battery units during charge and discharge was apt to occur, leading to the deterioration in charge-and-discharge cycle. Furthermore, since the voltage of the first battery unit hardly drops even at the end of the discharge of the battery module, the over-voltage is applied to the second battery unit. It is considered that the over-voltage increased accordingly, and the second battery unit was apt to be deteriorated as the cause.

Also in the battery module of Comparative Example 4, the capacity retention ratio in the cycle test was low. In the battery module of Comparative Example 4, it is considered that the lithium-inserting-and-extracting potentials of the graphite included in the first nonaqueous electrolyte battery included in the first battery unit were largely different from those of the spinel-type lithium-titanate included in the second nonaqueous electrolyte battery as the second battery unit, and were close to the lithium metal potential in the state-of-full charge, as a result of which the deterioration of the first nonaqueous electrolyte battery was accelerated due to the precipitation of lithium metal. Therefore, the battery module of Comparative Example 4 made it difficult to adjust the potential of the olivine-type lithium phosphate LiM$_A$PO$_4$ and the potential of the lithium-containing composite oxide LiM$_B$O$_2$ during charge and discharge. As a result, it is considered that the battery module of Comparative Example 4 cannot prevent the over-discharge of the olivine-type lithium phosphate LiM$_A$PO$_4$ and the over-charge of the lithium-containing composite oxide LiM$_B$O$_2$.

Also in the battery module of Comparative Example 5, the capacity retention ratio in the cycle test was low. The reason will be described in detail with reference to FIG. 9.

FIG. 9 shows the discharge curves of the battery module of Example 1 and the battery module of Comparative Example 5.

As apparent from FIG. 9, in the battery module of Example 1, a voltage change accompanying a change in a state-of-charge was large in a low state-of-charge. Therefore, in the battery module of Example 1, it is possible to grasp the state-of-charge using a voltage change as an index in a low state-of-charge and therefore to prevent the battery module of Example 1 from falling into an over-discharge state during discharge.

On the other hand, as apparent from FIG. 9, in the battery module of Comparative Example 5, a voltage change accompanying a change in a state-of-charge due to discharge was small. In particular, in the battery module of Comparative Example 5, a voltage change accompanying a change in the state-of-charge due to discharge was small even in a low state-of-charge. Therefore, it is considered that in the battery module of Comparative Example 5, it was not possible to grasp the state-of-charge using a voltage change as an index in a low state-of-charge, as a result of which the battery module of Comparative Example 5 falls into an over-discharge of charge during discharge.

Also in the battery module of Comparative Example 6, the capacity retention ratio in the cycle test was low. In the battery module of Comparative Example 6, it was difficult to adjust the potential of the olivine-type lithium phosphate $LiM_APO_4$ and the potential of the lithium-containing composite oxide $LiM_BO_2$ during charge and discharge. Therefore, it is considered that the battery module of Comparative Example 6 cannot prevent the over-discharge of the olivine-type lithium phosphate $LiM_APO_4$ and the over-charge of the lithium-containing composite oxide $LiM_BO_2$.

That is, even when the positive electrode including both the olivine-type lithium phosphate $LiM_APO_4$ and the lithium-containing composite oxide $LiM_BO_2$ is used in one battery as in Comparative Example 6, the battery module of Comparative Example 6 cannot exhibit excellent life characteristics as in the battery modules of Examples 1 to 14 which include the first battery unit and the second battery unit so that the capacity ratio Ca/Cb is within the range of $1.5 < Ca/Cb \leq 50$.

Also in the battery module of Comparative Example 7, the capacity retention ratio in the cycle test was low. This is considered to be because, in the battery module of Comparative Example 7, the second nonaqueous electrolyte battery in the battery module was apt to be over-charged in a high state-of-charge, as a result of which the second nonaqueous electrolyte battery is over-charged.

A battery module according to one or more embodiments and examples described above includes a first battery unit including a first nonaqueous electrolyte battery and a second battery unit electrically connected in series to the first battery unit and including a second nonaqueous electrolyte battery. Each of the first and second nonaqueous electrolyte batteries includes a negative electrode including a spinel-type lithium titanate. The first nonaqueous electrolyte battery includes a positive electrode including at least one olivine-type lithium phosphate. The second nonaqueous electrolyte battery includes a positive electrode including at least one lithium-containing composite oxide. A discharge capacity Ca [Ah] of the first battery unit and a discharge capacity Cb [Ah] of the second battery unit satisfy the relational expression of $1.5 < Ca/Cb \leq 50$. Thereby, the battery module according to the first embodiment can be prevented from reaching a state-of-charge in which the deterioration of the first nonaqueous electrolyte battery may be promoted, and reaching a state-of-charge in which the deterioration of the second nonaqueous electrolyte battery may be promoted. As a result, the battery module according to the first embodiment can exhibit excellent life characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery module comprising:
a first battery unit comprising a n first nonaqueous electrolyte battery, wherein n is an integer of 2 or more, the first nonaqueous electrolyte battery comprising a negative electrode comprising a spinel-type lithium titanate, a positive electrode comprising at least one olivine-type lithium phosphate represented by a formula of $LiM_APO_4$, wherein $M_A$ is at least one metal element selected from the group consisting of Mn, Fe, Co, Ni, Mg and Ti, and a first nonaqueous electrolyte; and
a second battery unit comprising a m second nonaqueous electrolyte battery, wherein m is an integer of 1 or more, and electrically connected in series to the first battery unit, the second nonaqueous electrolyte battery comprising a negative electrode comprising the spinel-type lithium titanate, a positive electrode comprising at least one lithium-containing composite oxide represented by a formula of $LiM_BO_2$, wherein $M_B$ is at least one metal element selected from the group consisting of Mn, Co and Ni, and a second nonaqueous electrolyte,
wherein: a discharge capacity Ca [Ah] of the first battery unit and a discharge capacity Cb [Ah] of the second battery unit satisfy a relational expression of $1.5 < Ca/Cb \leq 50$;
the discharge capacity Ca is a capacity [Ah] obtained by subtracting a capacity Cm [Ah] of the battery module from a discharge capacity C1 [Ah] obtained by discharging the first battery unit of the battery module in a state-of-charge of 100% to a voltage of $1.5 \times n$ V at a constant current value of 0.2 C; and
the discharge capacity Cb is a capacity [Ah] obtained by subtracting the capacity Cm [Ah] of the battery module from a discharge capacity C2 [Ah] obtained by discharging the second battery unit of the battery module in the state-of-charge of 100% to a voltage of $1.5 \times m$ V at a constant current value of 0.2 C.

2. The battery module according to claim 1, wherein an open circuit voltage OCV of the second battery unit is 2.5 V or less in the battery module in a state-of-charge of 100%.

3. The battery module according to claim 1, wherein the at least one lithium-containing composite oxide comprises a lithium-containing composite oxide represented by a formula of $LiNi_{1-x-y}Co_xMn_yO_2$ ($0<x\leq0.4$; $0<y\leq0.4$).

4. The battery module according to claim 3, wherein the at least one lithium-containing composite oxide comprises a lithium-cobalt composite oxide.

5. The battery module according to claim 1, wherein the negative electrode comprised in the second nonaqueous electrolyte battery further comprises at least one titanium-containing oxide excluding the spinel-type lithium titanate.

6. The battery module according to claim 5, wherein the titanium-containing oxide is at least one selected from the group consisting of a monoclinic β-type titanium-containing oxide, an anatase-type titanium-containing oxide, a ramsdelide-type lithium titanate, a monoclinic niobium-titanium composite oxide and an orthorhombic sodium-containing niobium-titanium composite oxide.

7. The battery module according to claim 1, wherein the at least one olivine-type lithium phosphate comprises an olivine-type lithium phosphate represented by a formula of $LiMn_{1-s-t}Fe_sMg_tPO_4$, wherein $0<s\leq0.2$ and $0<t\leq0.2$.

8. The battery module according to claim 1, wherein the at least one olivine-type lithium phosphate comprises an olivine-type lithium-iron phosphate.

9. The battery module according to claim 1, wherein the discharge capacity Ca [Ah] of the first battery unit and the discharge capacity Cb [Ah] of the second battery unit satisfy a relational expression of $5<Ca/Cb\leq30$.

10. The battery module according to claim 1, wherein the discharge capacity Ca [Ah] of the first battery unit and the discharge capacity Cb [Ah] of the second battery unit satisfy a relational expression of $8<Ca/Cb\leq20$.

11. A battery pack comprising the battery module according to claim 1.

12. The battery pack according to claim 11, which comprises a plurality of battery modules, and the battery modules are electrically connected in series, parallel or a combination thereof.

13. The battery pack according to claim 11, further comprising:
an external power distribution terminal; and
a protective circuit.

14. A vehicle comprising the battery pack according to claim 11.

15. The battery module according to claim 1, wherein m is an integer of 2 or more.

16. The battery module according to claim 1, wherein the first battery unit comprises two or more first nonaqueous electrolyte batteries, and the two or more first nonaqueous electrolyte batteries are electrically connected in series.

* * * * *